United States Patent
Itagaki et al.

(10) Patent No.: US 12,405,440 B2
(45) Date of Patent: Sep. 2, 2025

(54) DRIVING-UNIT OPERATION METHOD AND CONTROLLER

(71) Applicants: Yoichi Itagaki, Tokyo (JP); Masahiro Ishikawa, Tokyo (JP); Daisuke Yamaguchi, Tokyo (JP); Miniswys S.A., Bienne (CH)

(72) Inventors: Yoichi Itagaki, Tokyo (JP); Masahiro Ishikawa, Tokyo (JP); Daisuke Yamaguchi, Tokyo (JP); Michael Brumann, Bienne (CH); Raphael Hoesli, Nidau (CH)

(73) Assignees: Miniswys S.A, Biel/Bienne (CH); MITSUMI ELECTRIC CO., LTD., Tokyo (JP)

( * ) Notice: Subject to any disclaimer, the term of this patent is extended or adjusted under 35 U.S.C. 154(b) by 756 days.

(21) Appl. No.: 17/783,672

(22) PCT Filed: Nov. 10, 2020

(86) PCT No.: PCT/JP2020/041911
§ 371 (c)(1),
(2) Date: Jun. 9, 2022

(87) PCT Pub. No.: WO2021/117404
PCT Pub. Date: Jun. 17, 2021

(65) Prior Publication Data
US 2023/0024495 A1   Jan. 26, 2023

(30) Foreign Application Priority Data
Dec. 13, 2019   (JP) ................................. 2019-225710

(51) Int. Cl.
*G02B 7/08*    (2021.01)
*G02B 27/64*   (2006.01)
(Continued)

(52) U.S. Cl.
CPC ............. *G02B 7/08* (2013.01); *G02B 27/646* (2013.01); *G03B 5/00* (2013.01); *G03B 13/36* (2013.01); *G03B 2205/0007* (2013.01)

(58) Field of Classification Search
CPC ... G02B 7/08; G02B 7/09; G02B 7/02; G02B 7/04; G02B 3/10; G02B 5/00;
(Continued)

(56) References Cited

U.S. PATENT DOCUMENTS 5,258,694 A   11/1993   Ohnishi et al.
7,429,812 B2   9/2008   Witteveen
(Continued)

FOREIGN PATENT DOCUMENTS

WO   2006-000118 A1   1/2006
WO   2019-068708 A2   4/2019

OTHER PUBLICATIONS

International Search Report from International Application No. PCT/JP2020/041911 mailed Jan. 19, 2021.
(Continued)

*Primary Examiner* — Emily P Pham
(74) *Attorney, Agent, or Firm* — Shih IP Law Group, PLLC

(57) ABSTRACT

A driving-unit operation method includes: generating pulse blocks on the basis of driving pulses; and modifying a driving signal in accordance with a position error signal. In the modifying the driving signal, when the position error signal is in a first range, the shape of the driving pulses is modified so as to form a first driving-pulse shape, and the pulse-block duty cycle is set to a first pulse-block duty cycle value, whereas when the position error signal is in a second range, the shape of the driving pulses is modified so as to form a second driving-pulse shape, and the pulse-block duty cycle is set to a second pulse-block duty cycle value.

13 Claims, 25 Drawing Sheets

(51) Int. Cl.
*G03B 5/00* (2021.01)
*G03B 13/36* (2021.01)

(58) Field of Classification Search
CPC ...... G02B 13/36; G02B 27/646; G02B 30/00; G02B 2205/0007; G02B 2205/0046; G02B 2205/0061; H02N 2/067; H02N 2/001; H02N 2/026; H02N 2/103; H02N 2/145; H02N 2/0075; H02N 2/008; H02N 2/14; H02N 23/55; H02N 23/687; H02N 23/60

See application file for complete search history.

(56) References Cited

U.S. PATENT DOCUMENTS

| | | |
|---|---|---|
| 11,962,883 B2* | 4/2024 | Sugiura .................. G03B 30/00 |
| 2004/0013420 A1 | 1/2004 | Hara |
| 2007/0164635 A1 | 7/2007 | Witteveen |
| 2017/0052386 A1* | 2/2017 | Siegrist .................. H02K 41/02 |

OTHER PUBLICATIONS

Tornonobu Senjyu, "Quick and Precise Position Control of Ultrasonic Motors with Two Control Inputs", Faculty of Engineering, University of the Ryukyus, Jun. 12, 1995, pp. 1-6.
Extended European Search Report, dated Nov. 29, 2023.

* cited by examiner

DRIVING-UNIT OPERATION METHOD AND CONTROLLER

TECHNICAL FIELD

The present invention relates to the field of small driving devices such as piezoelectric driving devices. Particularly, the present invention relates to a driving-unit operation method and a controller according to the preambles of the corresponding independent claims.

BACKGROUND ART

Small driving devices such as piezoelectric driving devices are disclosed in, for example, Patent Literatures (hereinafter, referred to as "PTLs") 1, 2, and 3. Those driving devices include one, two, or more arms configured to vibrate and drive a passive element by vibrational motion at the end of the arm. The frequency of an excitation means for driving the vibrational motion is selected such that the arm generates a vibration mode for moving the passive element in a first direction or in an opposite second direction. There is a need for further improvement of the driving device, particularly to control the position of the passive element relative to the active element, taking into account the nonlinear characteristics inherent in the design of the driving device.

CITATION LIST

Patent Literature

PTL 1
WO2006/000118
PTL 2
U.S. Pat. No. 7,429,812
PTL 3
WO2019/068708

SUMMARY OF INVENTION

Technical Problem

It is an object of the present invention to provide a driving-unit operation method enabling a positional control on the above-described type of driving unit, and a controller for controlling the operation of the driving unit.

Solution to Problem

These objects are achieved by a driving-unit operation method and a controller according to the claims.

A driving-unit operation method according to the present invention is
a method for operating a driving unit that drives a passive element relative to an active element,
the active element including a resonator and at least one excitation section configured to excite a vibration of the resonator,
the resonator including at least one arm extending from a coupling portion of the resonator,
the at least one arm including a contact portion at an outer end of the at least one arm,
the contact portion being movable by vibrational motion of the at least one arm,
the passive element being disposed to be driven by the vibrational motion to move relative to the active element,
the passive element including a first contact region and being disposed such that the first contact region makes contact with the first contact portion,
the active element and the passive element being disposed such that at least the first contact portion is pushed toward the first contact region by a prestressing force when the active element is not excited, the method including:
driving the at least one excitation section by a drive signal that is a periodic signal including a drive pulse repeated at an excitation frequency, while repeatedly omitting the drive pulse, thereby generating a periodically repeated pulse block with a pulse block duty cycle expressed by a relation Ton/Tb between a pulse block on time Ton and a pulse block cycle Tb; and
modifying the drive signal depending on the position error signal, in which
in the modifying the drive signal:
in case that a position error signal is within a first range, a shape of the drive pulse is modified into a first driving pulse shape or the excitation frequency is modified by a first excitation frequency detuning value, and the pulse block duty cycle is set to a first pulse block duty cycle value, and
in case that the position error signal is within a second range, the shape of the drive pulse is modified into a second drive pulse shape or the excitation frequency is modified by a second excitation frequency detuning value, and the pulse block duty cycle is set to a second pulse block duty cycle value.

A controller according to the present invention is
a controller configured to perform the driving-unit operation method as described above, in which
the controller is configured to be connected to and supply electric power to the at least one excitation section of the driving unit, and to judge a position of the driving unit by reading a signal from a sensor.

DESCRIPTION OF EMBODIMENTS

Hereinafter, embodiments of the present invention will be described in detail with reference to the drawings.

Embodiment 1

Figure 1A:
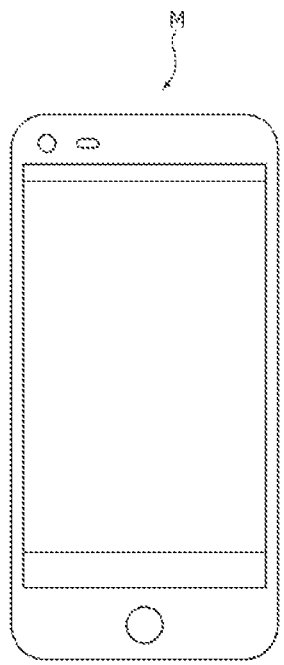
FIGS. 1A and 1B illustrate a smartphone in which a camera module according to an embodiment of the present invention is mounted.
Figure 1B:
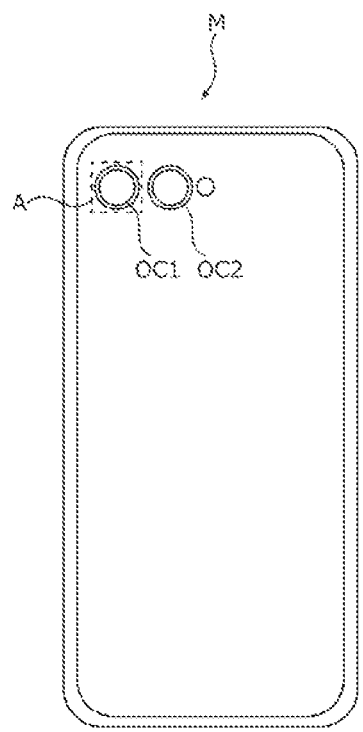

FIGS. 1A and 1B illustrate smartphone M (an example of a camera-mounted device) in which camera module A according to an embodiment of the present invention is mounted. FIG. 1A is a front view of smartphone M and FIG. 1B is a rear view of smartphone M.

Smartphone M includes a dual camera consisting of two back side cameras OC1 and OC2. In the present embodiment, camera module A is applied to back cameras OC1 and OC2.

Camera module A has an AF function and an OIS function, and can capture an image without image blurring by automatically performing focusing at the time of capturing a subject and by optically correcting shake (vibration) caused at the time of capturing the image.

Figure 2:
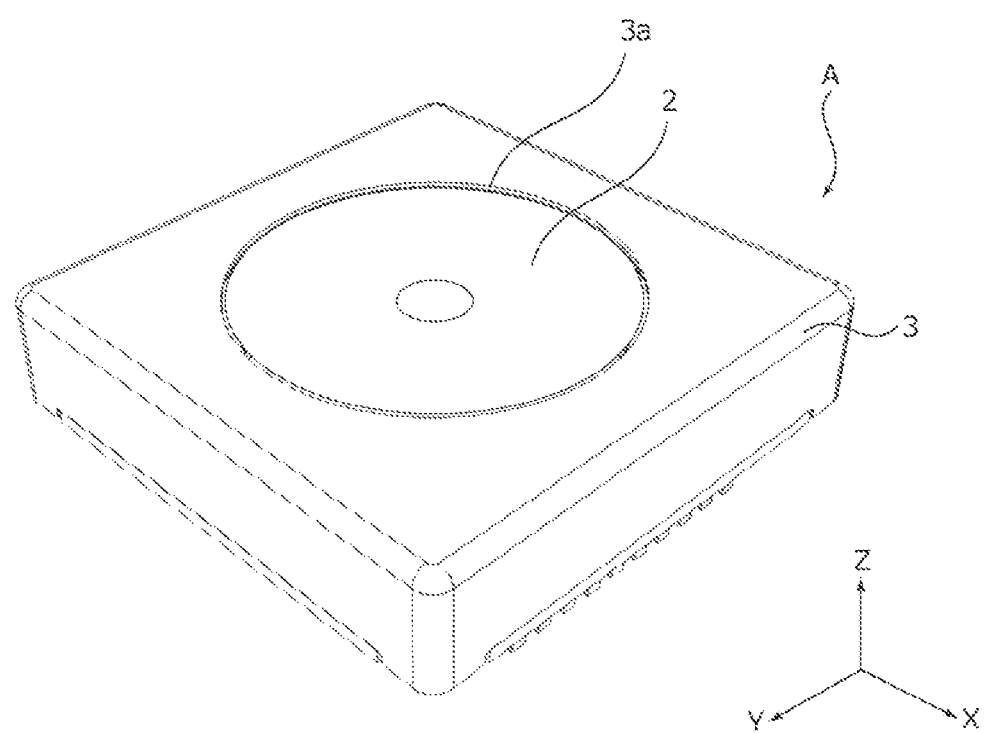
FIG. 2 is a perspective view of an external appearance of the camera module.
Figure 3A:
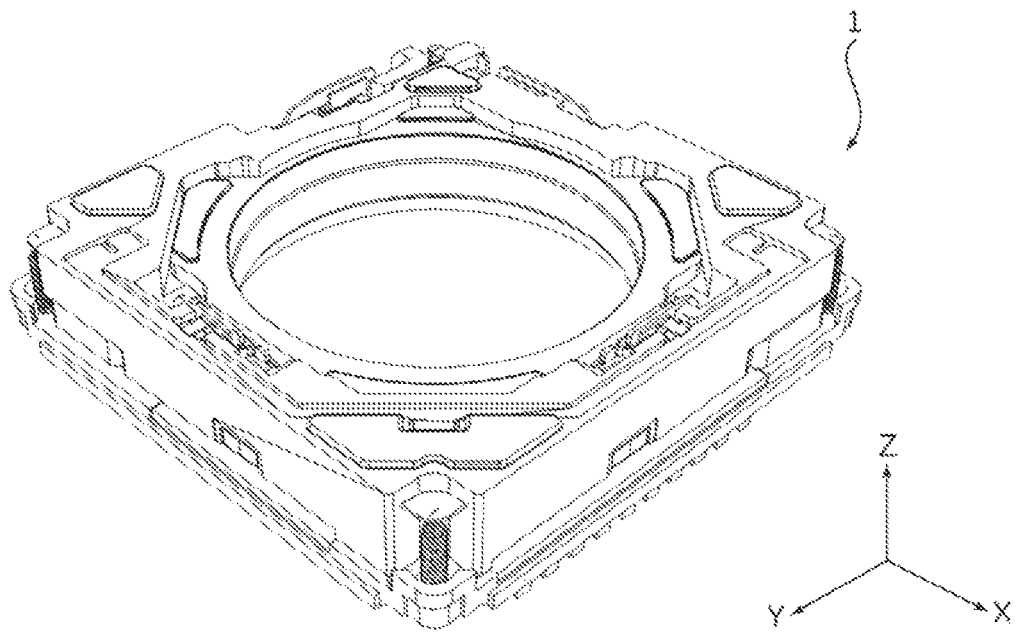
FIGS. 3A and 3B are external perspective views of a lens driving device according to Embodiment 1.
Figure 3B:
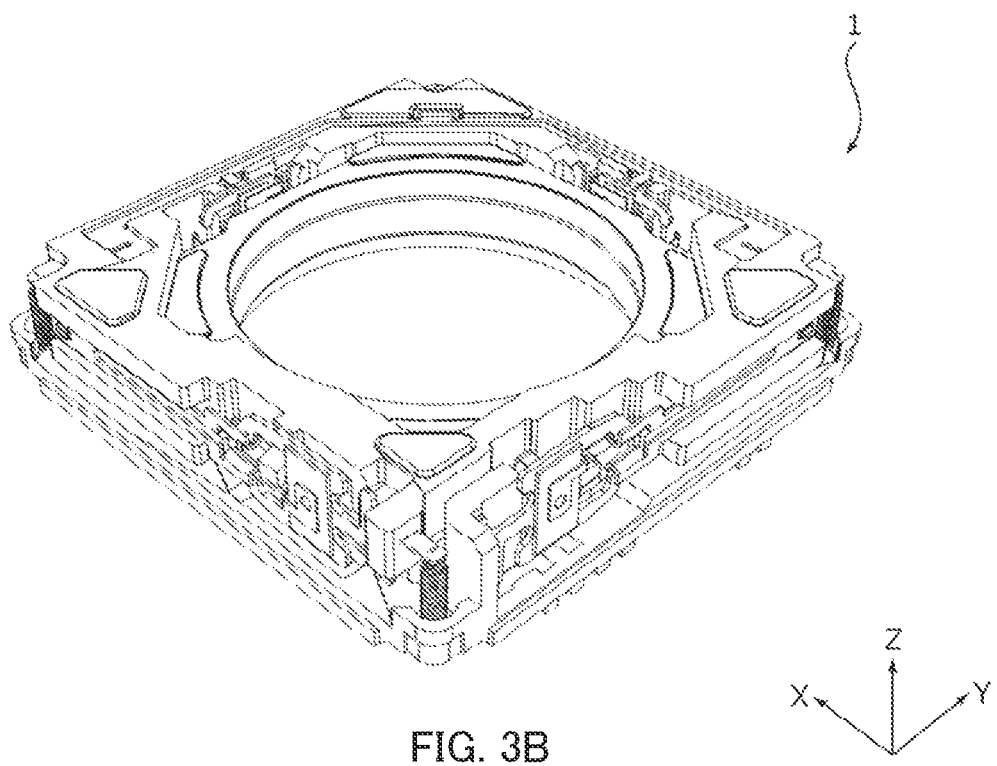

FIG. 2 is a perspective view of an external appearance of camera module A. FIGS. 3A and 3B are external perspective views of lens driving device 1 according to Embodiment 1. FIG. 3B illustrates lens driving device 1 rotated 180° around the Z-axis from the state of FIG. 3A. As illustrated in FIGS. 2, 3A, and 3B, the present embodiment will be described using an orthogonal coordinate system (X, Y, Z). The same orthogonal coordinate system (X, Y, Z) is also used for illustration of below-mentioned figures.

Camera module A is mounted such that the vertical direction (or horizontal direction) is the X-direction, the horizontal direction (or vertical direction) is the Y-direction, and the front-rear direction is the Z-direction, for example, during actually capturing an image with smartphone M. That is, the Z-direction is the optical-axis direction, the upper side (+Z side) in the figures is the light reception side in the optical-axis direction, and the lower side (?Z side) is the image formation side in the optical-axis direction. In addition, the X- and Y-directions orthogonal to the Z-axis are referred to as "optical-axis-orthogonal directions" and the XY plane is referred to as "optical-axis-orthogonal plane."

As illustrated in FIGS. 2, 3A, and 3B, camera module A includes: lens driving device 1 that implements the AF function and the OIS function; lens part 2 composed of a cylindrical lens barrel and a lens housed therein; an image capturing part (not illustrated) configured to capture a subject image imaged by lens part 2; cover 3 covering the entire camera module and the like.

Cover 3 as seen in plan view in the optical-axis direction is a capped rectangular cylindrical member. In the present embodiment, cover 3 as seen in plan view in the optical-axis direction has a square shape. Cover 3 includes, in its upper surface, substantially circular opening 3a. Lens part 2 faces the outside via opening 3a and is configured to protrude from an opening surface of cover 3 on the light reception side, with movement in the optical-axis direction. Cover 3 is fixed, for example, adhesively to base 21 (see FIG. 4) of OIS fixing part 20 of lens driving device 1.

The image capturing part (not illustrated) is disposed on the image formation side of lens driving device 1 in the optical-axis direction. The image capturing part (not illustrated) includes, for example, an image sensor board and an image capturing device mounted on the image sensor board. The image capturing device is composed of, for example, a charge-coupled device (CCD) image sensor, a complementary metal oxide semiconductor (CMOS) image sensor, or the like. The image capturing device captures a subject image imaged by lens part 2. Lens driving device 1 is mounted on an image sensor board (not illustrated) and is mechanically and electrically connected to the image sensor board. A control part that performs driving control on lens driving device 1 may be disposed on the image sensor board, or may be disposed on a camera-mounted apparatus on which camera module A is mounted (smartphone M in the present embodiment).

Figure 4:
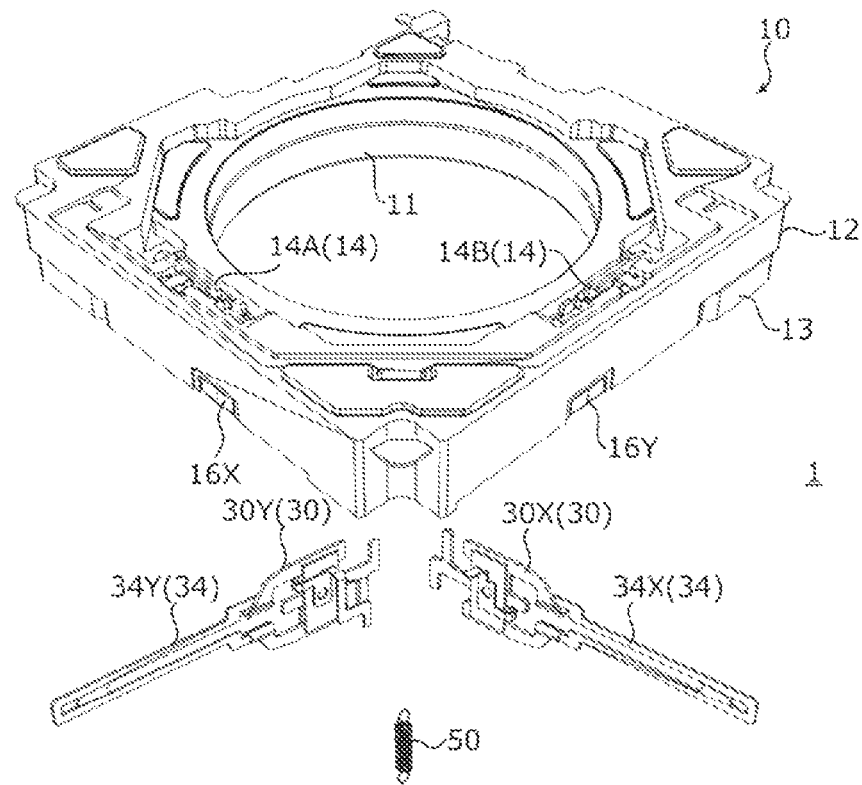
FIG. 4 is an exploded perspective view of the lens driving device according to Embodiment 1.
Figure 4:
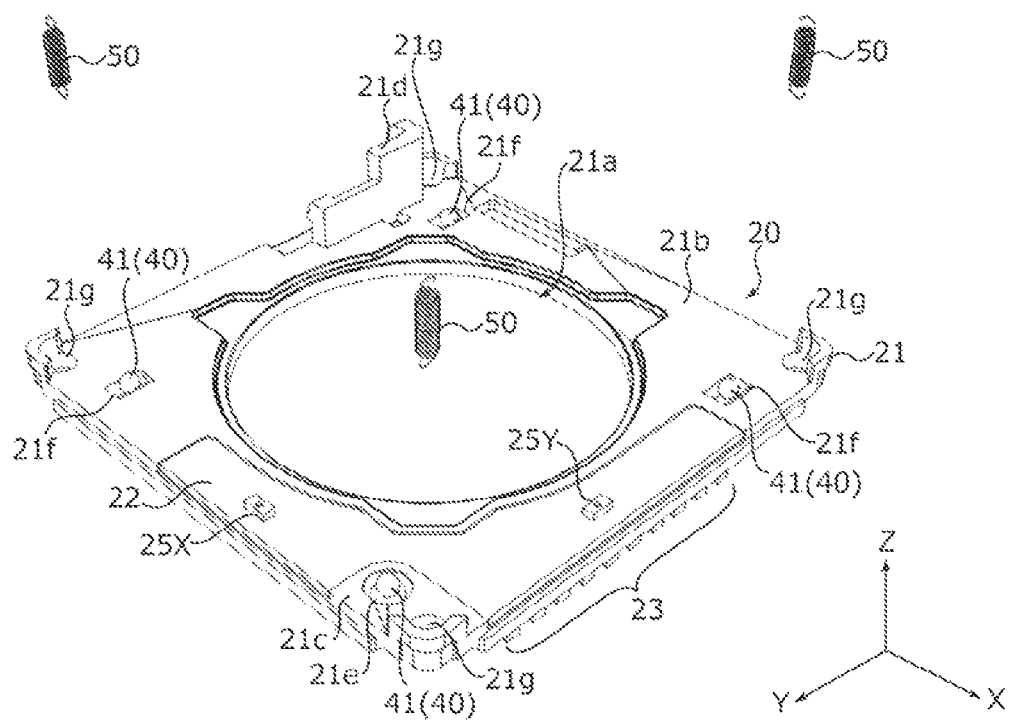
Figure 5:
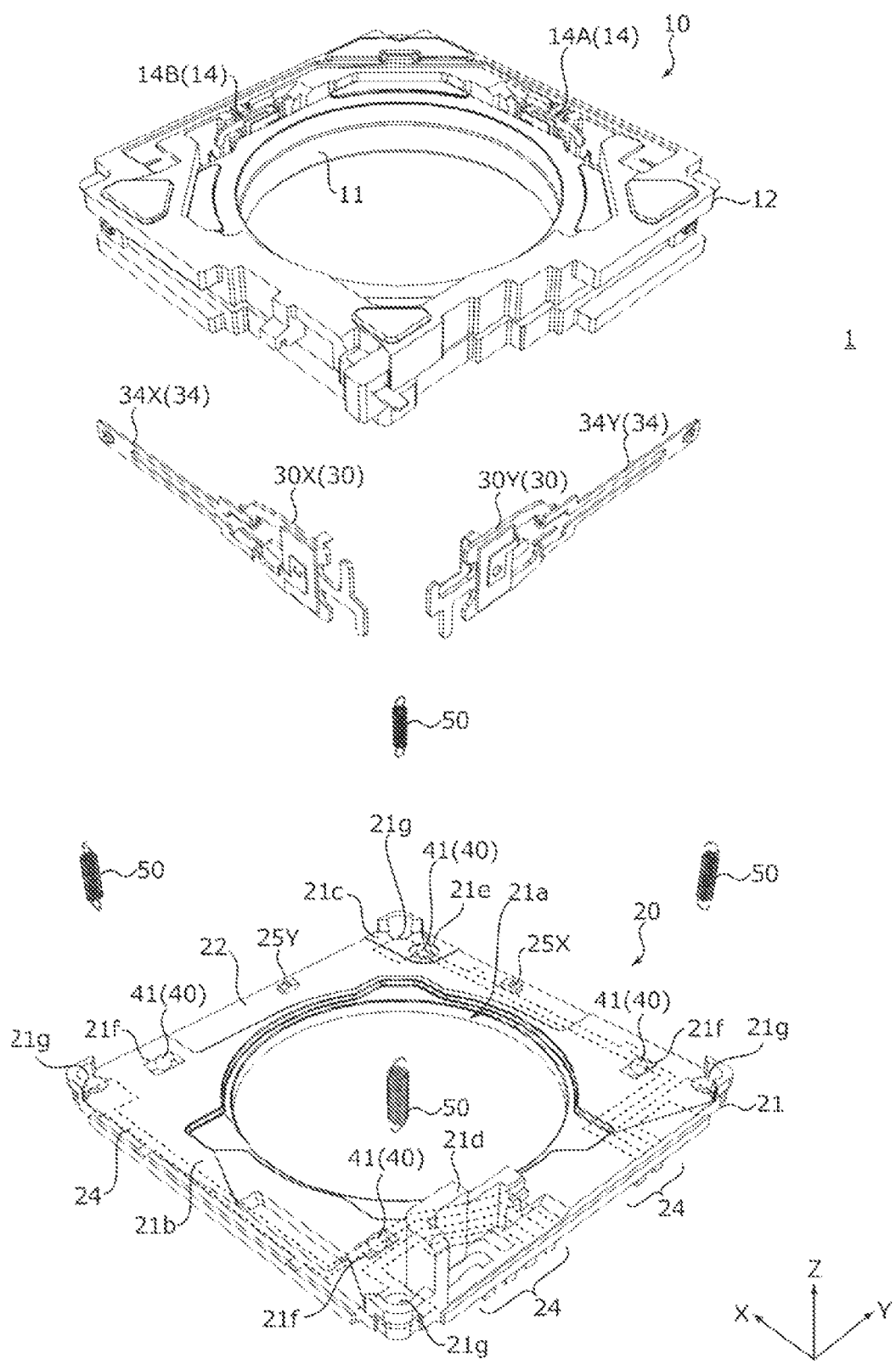
FIG. 5 is an exploded perspective view of the lens driving device according to Embodiment 1.

FIGS. 4 and 5 are exploded perspective views of lens driving device 1 according to Embodiment 1. FIG. 5 illustrates the lens driving device rotated 180° around the Z-axis from the state of FIG. 4.

As illustrated in FIGS. 4 and 5, in the present embodiment, lens driving device 1 includes OIS movable part 10 (second movable part), OIS fixing part 20 (second fixing part), OIS driving part 30 (XY-direction driving part) and OIS supporting part 40 (second supporting part). Note that, in FIG. 5, a portion of interconnections 24 which is embedded in base 21 is illustrated by a dotted line.

OIS movable part 10 is a part that sways in the optical-axis-orthogonal plane during shake correction. OIS movable part 10 includes an AF unit, second stage 13, and balls 42. The AF unit includes AF movable part 11 (first movable part), first stage 12 (first fixing part), AF driving part 14 (Z-direction driving part), and AF supporting part 15 (first supporting part) (see FIGS. 7 to 9).

OIS fixing part 20 is a part to which OIS movable part 10 is connected via OIS supporting part 40. OIS fixing part 20 includes base 21.

OIS movable part 10 is disposed to be spaced apart from OIS fixing part 20 in the optical-axis direction, and is coupled to OIS fixing part 20 via OIS supporting part 40. Further, OIS movable part 10 and OIS fixing part 20 are biased in a direction approaching each other by OIS biasing members 50 disposed on four corners.

In the present embodiment, for the movement in the Y-direction, entire OIS movable part 10 including the AF unit moves as a movable body. In addition, for the movement in the X-direction, only the AF unit moves as a movable body. That is, for the movement in the X-direction, second stage 13 together with base 21 constitutes OIS fixing part 20, and balls 42 function as OIS supporting part 40.

Base 21 as seen in plan view is a rectangular member that is formed of, for example, a molded material made of polyarylate (PAR), a PAR alloy that is a mixture of multiple resin materials containing PAR (e.g., PAR/PC), or a liquid crystal polymer. Base 21 includes circular opening 21a at the center.

Base 21 includes first base portion 21b forming the main surface of base 21, and second base portion 21c formed at one corner of the four corners. A portion of the base between first base portion 21b and second base portion 21c is formed to be recessed. Sensor board 22 is disposed in this recess, and first base portion 21b, second base portion 21c, and sensor board 22 form a flat base surface.

Base 21 includes, at a portion located diagonally with respect to second base portion 21c, OIS motor fixing portion 21d on which second OIS driving part 30Y is disposed. OIS motor fixing portion 21d is formed to protrude from first base portion 21b toward the light reception side in the optical-axis direction, and has a shape allowing second OIS driving part 30Y to be held.

Terminal metal fixtures 23 and interconnections 24, for example, are disposed in base 21 by insert molding. Interconnections 24 include a power supply line for AF driving part 14 and OIS driving part 30. Interconnections 24 are exposed in openings 21g formed in the four corners of base 21 and are electrically connected to OIS biasing members 50. Power supply to AF driving part 14 and first OIS driving part 30X is performed via OIS biasing members 50. Terminal metal fixtures 23 are electrically connected to interconnections (not illustrated) formed in sensor board 22.

In addition, base 21 includes ball housings 21e and 21f for housing balls 41. Ball housing 21e formed in second base portion 21c is formed to be recessed in a circular shape, and three ball housings 21f formed in first base portion 21b are formed to be recessed in a rectangular shape extending in the Y direction. The side surfaces of ball housings 21f, for example, are formed in a tapered shape so that a groove width decreases toward the bottom side.

Sensor board 22 includes the interconnections (not illustrated) including the power supply lines and the signal lines for magnetic sensors 25X and 25Y. Magnetic sensors 25X and 25Y are mounted on sensor board 22. Magnetic sensors 25X and 25Y are, for example, composed of a Hall element, Tunnel Magneto Resistance (TMR) sensor, or the like, and are electrically connected to terminal metal fixtures 23 via the interconnections (not illustrated) formed in sensor board 22. Magnets 16X and 16Y are disposed on first stage 12 of OIS movable part 10 at positions facing magnetic sensors 25X and 25Y. Position detection parts composed of magnetic sensors 25X and 25Y and magnets 16X and 16Y detect the position of OIS movable part 10 in the X- and Y-directions. Note that, in place of magnets 16X and 16Y and magnetic sensors 25X and 25Y, an optical sensor such as a photoreflector may detect the position of OIS movable part 10 in the X- and Y-directions.

OIS biasing members 50 include, for example, tension coil springs, and couple OIS movable part 10 to OIS fixing part 20. In the present embodiment, one ends of OIS biasing members 50 are connected to interconnections 24 of base 21, and the other ends are connected to interconnections 17 of first stage 12. OIS biasing members 50 are subjected to a tensile load when OIS movable part 10 is coupled to OIS fixing part 20, and act on OIS movable part 10 and OIS fixing part 20 such that OIS movable part 10 and OIS fixing part 20 approach each other. That is, OIS movable part 10 is held to be capable of swaying in the XY plane by OIS biasing members 50 while biased in the optical-axis direction (while pressed against base 21). Thus, it is possible to hold OIS movable part 10 stably without rattling. Moreover, in the present embodiment, OIS biasing members 50 function as power supply lines for AF driving part 14 and first OIS driving part 30X.

OIS supporting part 40 supports OIS movable part 10 with respect to OIS fixing part 20 in a state where OIS movable part 10 is spaced apart from OIS fixing part 20 in the optical-axis direction. In the present embodiment, OIS supporting part 40 includes four balls 41 interposed between OIS movable part 10 (first stage 12 and second stage 13) and base 21. One ball 41 disposed in ball housing 21e of base 21 is interposed between base 21 and first stage 12, and three balls 41 disposed in ball housings 21f are interposed between base 21 and second stage 13.

Figure 7:
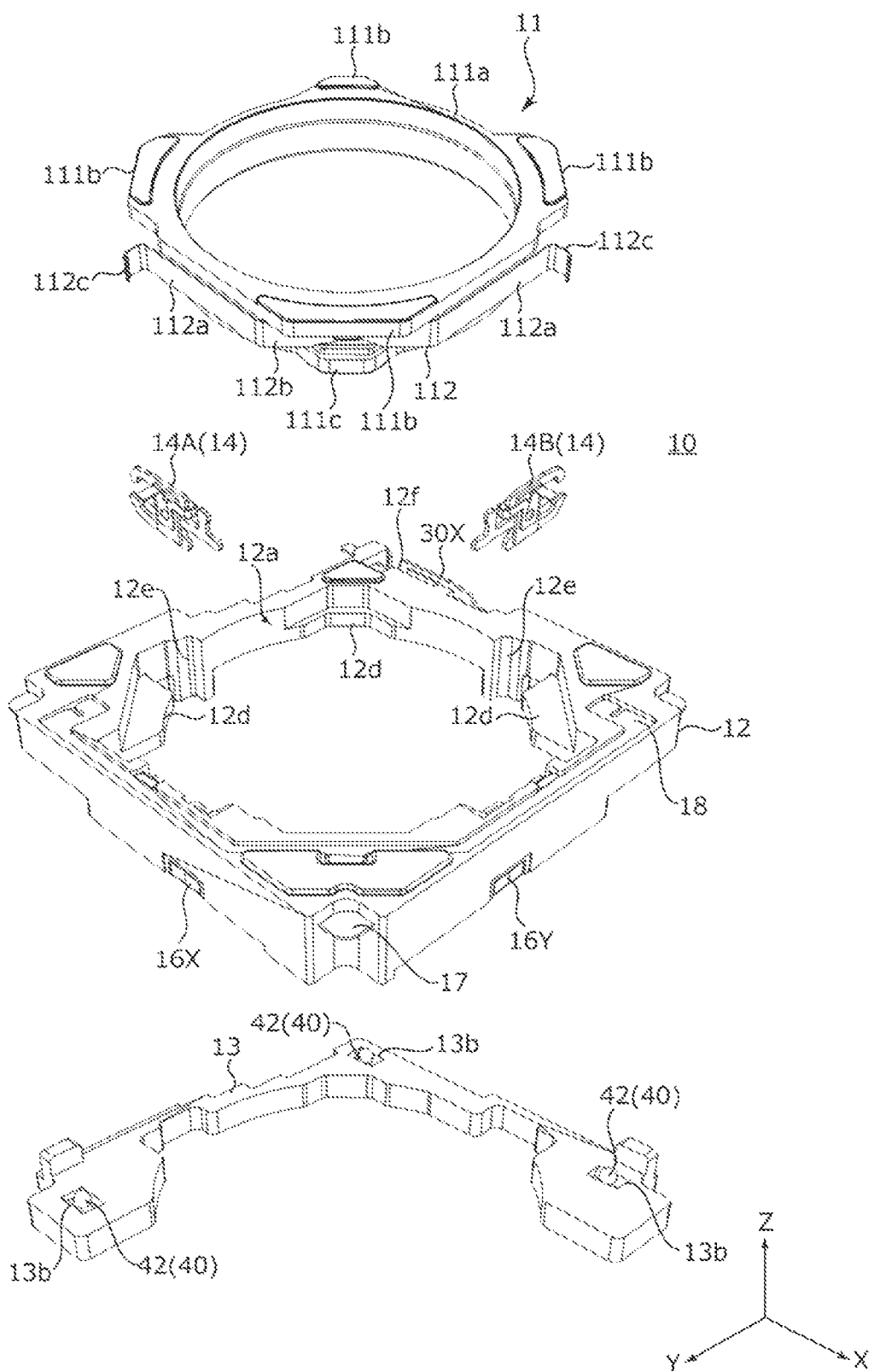
FIG. 7 is an exploded perspective view of an OIS movable part according to Embodiment 1.

Further, OIS supporting part 40 includes three balls 42 interposed between first stage 12 and second stage 13 in OIS movable part 10 (see FIG. 7 or the like).

In the present embodiment, restricting the directions in which balls 41 and 42 (total of seven balls) constituting OIS supporting part 40 are rollable allows OIS movable part 10 to sway in the XY plane accurately. Note that, the number of balls 41 and 42 constituting OIS supporting part 40 can be appropriately changed.

OIS driving part 30 is an actuator that moves OIS movable part 10 in the X- and Y-directions. Specifically, OIS driving part 30 is composed of first OIS driving part 30X (first XY-direction driving part) for moving OIS movable part 10 (AF unit alone) in the X-direction, and second OIS driving part 30Y (second XY-direction driving part) for moving entire OIS movable part 10 in the Y-direction.

Each of first and second OIS driving parts 30X and 30Y is composed of an ultrasonic motor. First OIS driving part 30X is fixed to OIS motor fixing portion 12f of first stage 12 in such a manner as to extend along the X-direction. Second OIS driving part 30Y is fixed to OIS motor fixing portion 21d of base 21 in such a manner as to extend along the Y-direction. That is, first OIS driving part 30X and second OIS driving part 30Y are disposed along the sides orthogonal to each other.

Figure 6A:
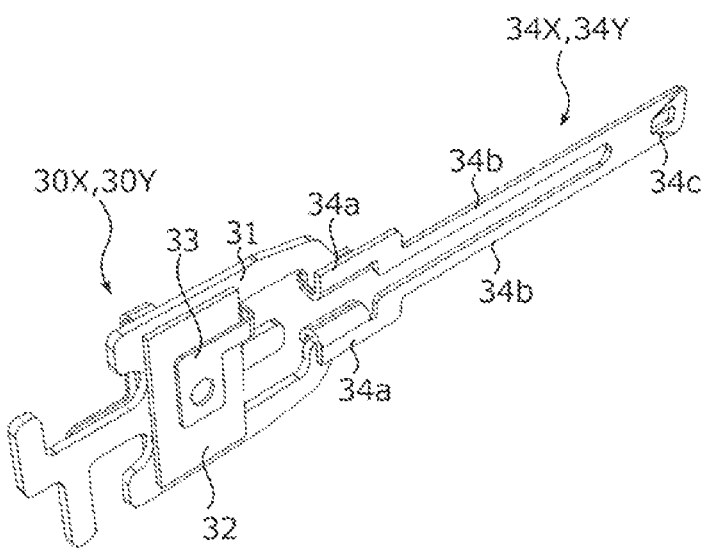
FIGS. 6A and 6B are perspective views of an OIS driving part.
Figure 6B:
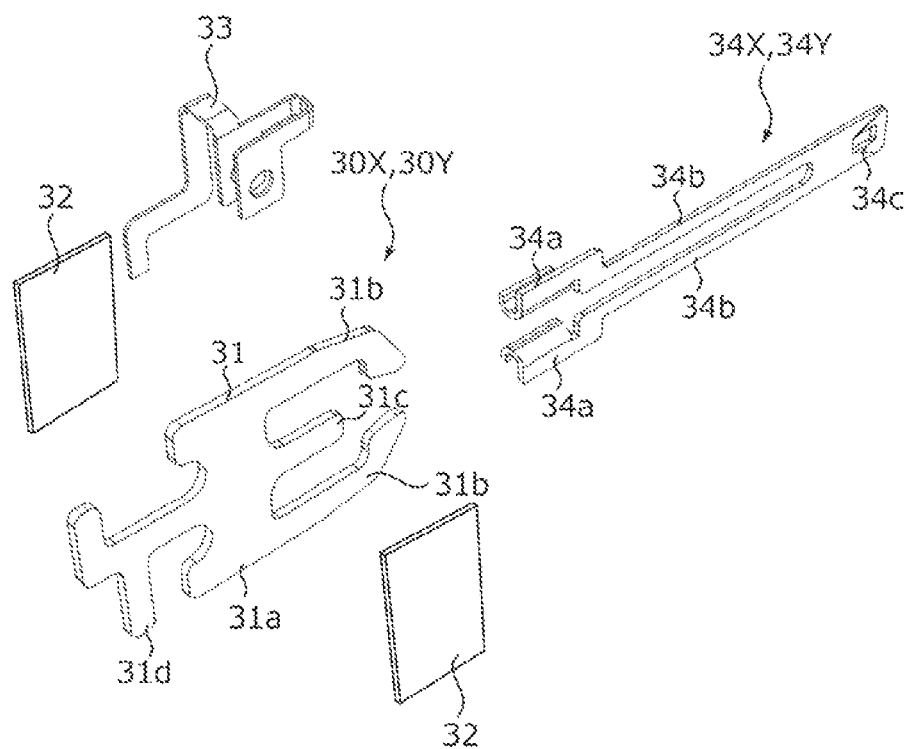

The configuration of OIS driving parts 30 is illustrated in FIGS. 6A and 6B. FIG. 6A illustrates OIS driving part 30 whose members are assembled, and FIG. 6B illustrates OIS driving part 30 whose members are disassembled. Note that, although FIGS. 6A and 6B illustrate second OIS driving part 30Y, the illustrations are treated as illustrations of OIS driving parts 30 since the principal configuration of first OIS driving part 30X, specifically, the configuration excluding the shapes of OIS resonant portion 31 and OIS electrode 33, is the same as that of second OIS driving part 30Y.

As illustrated in FIGS. 6A and 6B, OIS driving part 30 includes OIS resonant portion 31, OIS piezoelectric elements 32, and OIS electrode 33. The driving force of OIS driving part 30 is transmitted to second stage 13 via OIS power transmission part 34. Specifically, first OIS driving part 30X is connected to first OIS power transmission part 34X, and second OIS driving part 30Y is connected to second OIS power transmission part 34Y.

OIS piezoelectric elements 32 are, for example, plate-shaped elements formed of a ceramic material, and generate a vibration by high-frequency voltage application.

OIS electrode 33 holds OIS resonant portion 31 and OIS piezoelectric elements 32 in between, and applies a voltage to OIS piezoelectric elements 32. OIS electrode 33 of first OIS driving part 30X is electrically connected to power supply plate 18, and OIS electrode 33 of second OIS driving part 30Y is electrically connected to interconnections 24 of base 21.

OIS resonant portion 31 is formed of a conductive material and resonates with the vibration of OIS piezoelectric elements 32 to convert the vibrational motion into a linear motion. In the present embodiment, OIS resonant portion 31 includes substantially rectangular body portion 31a sandwiched by OIS piezoelectric elements 32, two arm portions 31b extending from the upper and lower portions of body portion 31a, protruding portion 31c extending in the Y-direction from the central portion of body portion 31a, and energization portion 31d extending from the central portion of body portion 31a on the opposite side of protruding portion 31c. Two arm portions 31b have symmetrical shapes whose free end portions make contact with OIS power transmission part 34 and symmetrically deform in resonance with the vibration of OIS piezoelectric elements 32. Energization portion 31d of first OIS driving part 30X is electrically connected to interconnections 17 of first stage 12, and energization portion 31d of second OIS driving part 30Y is electrically connected to interconnections 24 of base 21.

OIS piezoelectric elements 32 are bonded to body portion 31a of OIS resonant portion 31 in the thickness direction and are held in between by OIS electrode 33, so that these are electrically connected to one another. For example, one side of a power supply path is connected to OIS electrode 33, and the other side is connected to energization portion 31d of OIS resonant portion 31. A voltage is applied to OIS piezoelectric elements 32, and a vibration is thus generated.

OIS resonant portion 31 has at least two resonant frequencies, and deforms in behaviors different between the resonant frequencies. In other words, the entire shape of OIS resonant portion 31 is set such that OIS resonant portion 31 deforms in behaviors different between the two resonant frequencies. The different behaviors include a behavior causing OIS power transmission part 34 to move forward in the X- or Y-direction, and a behavior causing OIS power transmission part 34 to move backward in the X- or Y-direction.

OIS power transmission part 34 is a chucking guide extending in one direction, which is connected at one end to OIS driving part 30 and is connected at the other end to second stage 13. OIS power transmission part 34 includes OIS motor contact portions 34a, stage fixing portion 34c, and coupling portion 34b. OIS motor contact portions 34a as seen in a cross section are formed in a substantially U shape. The OIS motor contact portions make contact with the free end portions of arm portions 31b of OIS resonant portion 31. Stage fixing portion 34c is disposed at an end portion of OIS power transmission part 34 and is fixed to OIS chucking guide fixing portion 13c of second stage 13 (see FIG. 8 and the like). Coupling portion 34b is a portion that couples OIS motor contact portions 34a to stage fixing portion 34c, and is formed to branch into two and extend from stage fixing portion 34c such that the two branch portions are substantially parallel with each other.

The width between OIS motor contact portions 34a is set wider than the width between the free end portions of arm portions 31b of OIS resonant portion 31. Thus, when OIS power transmission part 34 is attached to OIS driving part 30, OIS power transmission part 34 functions as a leaf spring, and a biasing force acts in a direction of pushing out arm portions 31b of OIS resonant portion 31. This biasing force allows OIS power transmission part 34 to be held between the free end portions of arm portions 31b of OIS resonant portion 31. Accordingly, the driving force from OIS resonant portion 31 is efficiently transmitted to OIS power transmission part 34.

OIS driving part 30 and OIS power transmission part 34 are only in contact with each other in a biased state; hence, it is possible to lengthen the movement distance stroke of OIS movable part 10 only by increasing the contact portions in the X- or Y-direction without enlarging the outer shape of lens driving device 1.

First OIS driving part 30X is fixed to OIS movable part 10 (first stage 12) and is connected to second stage 13 via OIS power transmission part 34X, and moves together with OIS movable part 10 during shake correction performed by second OIS driving part 30Y in the Y-direction. On the other hand, second OIS driving part 30Y is fixed to OIS fixing part 20 (base 21) and is connected to second stage 13 via OIS power transmission part 34Y, and is not affected by shake correction performed by first OIS driving part 30X in the X-direction. That is, the movement of OIS movable part 10 by one of OIS driving parts 30 is not hindered by the structure of the other one of OIS driving parts 30. Therefore, it is possible to prevent rotation of OIS movable part 10 around the Z-axis, so as to allow OIS movable part 10 to sway in the XY plane accurately.

Figure 8:
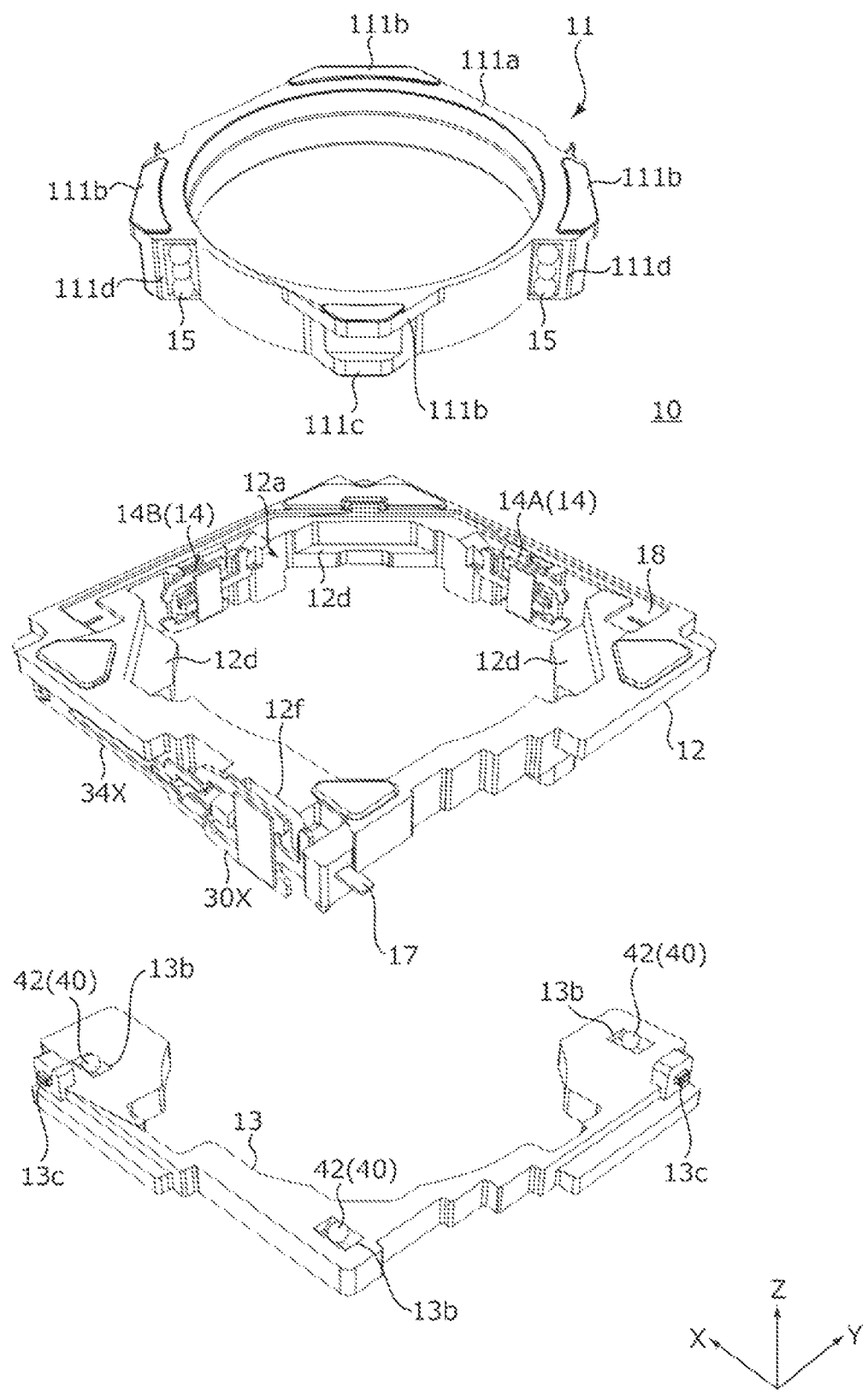
FIG. 8 is an exploded perspective view of the OIS movable part according to Embodiment 1.
Figure 9:
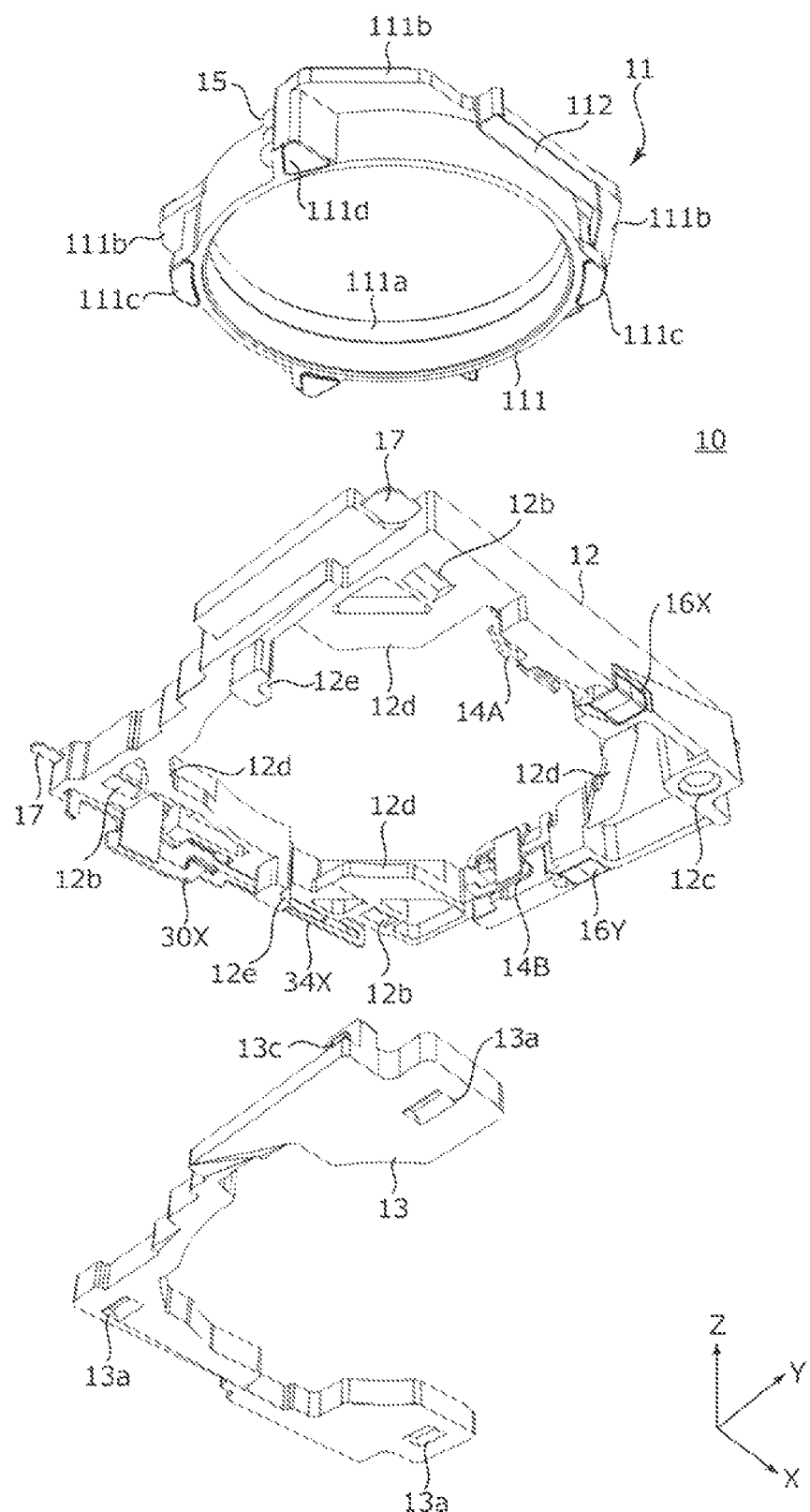
FIG. 9 is an exploded perspective view of the OIS movable part according to Embodiment 1.

FIGS. 7 to 9 are exploded perspective views of OIS movable part 10. FIG. 8 illustrates OIS movable part 10 rotated 180° around the Z-axis from the state of FIG. 7. FIG. 9 is a lower perspective view illustrating OIS movable part 10 rotated 90° around the Z-axis from the state of FIG. 7.

As illustrated in FIGS. 7 to 9, in the present embodiment, OIS movable part 10 includes AF movable part 11, first stage 12, second stage 13, AF driving part 14, AF supporting part 15, and the like. For the movement in the Y-direction, entire OIS movable part 10 including first stage 12 and second stage 13 is a movable body, whereas for the movement in the X-direction, second stage 13 functions as OIS fixing part 20 and only the AF unit functions as OIS movable part 10. Further, first stage 12 functions as an AF fixing part.

AF movable part 11 is a part that moves in the optical-axis direction at the time of focusing. AF movable part 11 is disposed to be spaced radially inward from first stage 12 (AF fixing part), and is connected to first stage 12 via AF supporting part 15.

AF movable part 11 includes lens holder 111 and AF biasing member 112 for holding lens part 2 (see FIG. 2).

Lens holder 111 is formed of, for example, polyarylate (PAR), a PAR alloy that is a mixture of multiple resin materials containing PAR, a liquid crystal polymer, or the like. Lens holder 111 includes cylindrical lens housing 111a. Lens part 2 (see FIG. 2) is fixed to lens housing 111a, for example, by adhesion.

Lens holder 111 includes upper flanges 111b at the upper outer peripheral edge of lens housing 111a and lower flanges 111c at the lower outer peripheral edge. In the present embodiment, four upper flanges 111b are disposed at positions corresponding to the four corners of lens driving device 1, and lower flanges 111c are disposed below two of upper flanges 111b facing each other. Upper flanges 111b function as a restricting portion for restricting the movement of lens holder 111 to the image formation side (lower side) in the optical-axis direction, and lower flanges 111c function as a restricting portion for restricting the movement of lens holder 111 to the light reception side (upper side) in the optical-axis direction.

Lens holder 111 includes, in the peripheral surface of lens housing 111a, ball housings 111d for housing AF supporting part 15. In the present embodiment, ball housings 111d are disposed at two places that are line symmetric with respect to one diagonal direction (intermediate direction between the X direction and the Y direction) so that the ball housings are open on the same side (the side opposite to the side on which AF biasing member 112 is disposed) with respect to the other diagonal direction.

AF biasing member 112 is formed of a metal material such as, for example, titanium copper, nickel copper, or stainless steel, and is disposed so as to extend in the circumferential direction of lens holder 111. In the present embodiment, AF biasing member 112 is formed, for example, using a metal plate material by bending working, and includes leaf spring portions 112a extending in directions orthogonal to each other and coupling portion 112b coupling together leaf spring portions 112a. Leaf spring portions 112a have symmetrical shapes with respect to coupling portion 112b, and end portions 112c of leaf spring portion 112a are formed into a substantially U-shape by being folded back (hereinafter, referred to as "AF motor contact portion 112c").

AF biasing member 112 is fixed to lens holder 111 by attaching coupling portion 112b in one of the spaces between upper flanges 111b and lower flanges 111c of lens holder 111. Leaf spring portions 112a extend along the X direction and the Y direction.

First stage 12 is a part supporting AF movable part 11 via AF supporting part 15. Second stage 13 is disposed on the image formation side of first stage 12 in the optical-axis direction via balls 42. First stage 12 moves in the X- and Y-directions during shake correction, and second stage 13 moves only in the X-direction during shake correction.

First stage 12 is a substantially rectangular cylindrical member, and is formed of, for example, a liquid crystal polymer. First stage 12 includes a substantially circular opening 12a at a portion corresponding to lens holder 111. In first stage 12, the two sidewalls corresponding to second stage 13 are formed thinner by the thickness of the second stage than the other sidewalls.

First stage 12 includes, in its lower surface, three ball housings 12b for housing balls 42 and ball housing 12c for housing ball 41. Ball housings 12b are formed to be recessed in an oval shape extending in the X direction. The side surface of each of ball housings 12b is formed in a tapered shape such that the groove width decreases toward the bottom side. Ball housing 12c is formed to be recessed in a circular shape. Ball housings 12b face ball housings 13a in second stage 13 in the Z direction, and ball housing 12c faces ball housing 21e in base 21 in the Z direction.

First stage 12 includes flange portions 12d protruding inward from the lower four corners. When lens holder 111 is attached to first stage 12, upper flanges 111b of lens holder 111 are located above flange portions 12d, and lower flanges 111c of lens holder 111 are located below two of flange portions 12d which are diagonally located. That is, two flange portions 12d are sandwiched by upper flanges 111b and lower flanges 111c of lens holder 111 in a state in which they are spaced apart from each other by a distance by which lens holder 111 is movable.

First stage 12 includes, on the inner surface of one side wall along the X direction and one side wall along the Y direction, ball fixing portions 12e for fixing AF supporting part 15. First stage 12 includes, on one outer surface along the X direction, OIS motor fixing portion 12f for fixing first OIS driving part 30X. In first stage 12, the outer surface of one side wall along the Y direction is formed to be recessed inward, where second OIS driving part 30Y is located after assembly of lens driving device 1.

Further, in first stage 12, AF driving parts 14A and 14B are disposed on the inner surface of the other side wall along the X direction and the inner surface of the other side wall along the Y direction, and magnets 16X and 16Y for XY position detection are disposed on the lower surfaces of the side walls so as to face magnetic sensors 25X and 25Y in the Z direction. For example, magnet 16X is magnetized in the X-direction, and magnet 16Y is magnetized in the Y-direction.

Interconnections 17 are embedded in first stage 12, for example, by insert molding. Interconnections 17 are exposed at cutout portions in the outer surfaces of four corners of first stage 12, and one ends of OIS biasing members 50 are connected to this exposed portions. Further, power supply plate 18 electrically connected to interconnections 17 is disposed on the upper surface of first stage 12. Electric power is supplied to AF driving part 14 and first OIS driving part 30X via interconnections 17 and power supply plate 18.

Second stage 13 is an L-shaped member, and is formed of, for example, a liquid crystal polymer. The inner peripheral surface of second stage 13 is formed in an arc shape along the outer shape of lens holder 111. Like first stage 12, the outer surface of the side wall of second stage 13 along the Y-direction is formed to be recessed inward, where second OIS driving part 30Y is located after assembly of lens driving device 1. In the present embodiment, second stage 13 is formed in an L-shape, and second stage 13 is disposed below the two side walls formed thinner in first stage 12. With this configuration, the height reduction of OIS movable part 10 is achieved.

Second stage 13 includes, in its lower surface, three ball housings 13a for housing balls 41. Ball housings 13a face ball housings 21f in base 21. Ball housings 13a are formed to be recessed in an oval shape extending in the Y direction. Further, the side surface of each of ball housings 13a is formed in a tapered shape so that the groove width decreases toward the bottom side.

In addition, second stage 13 includes, in its upper surface, three ball housings 13b for housing balls 42. Ball housings 13b face ball housings 12b in first stage 12 in the Z direction. Ball housings 13b are formed to be recessed in an oval shape extending in the X direction. The side surface of each of ball housings 12b is formed in a tapered shape so that the groove width decreases toward the bottom side.

Three balls 41 constituting OIS supporting part 40 are held at multiple contact points by ball housings 21f of base 21 and ball housings 13a of second stage 13. Therefore, balls 41 roll stably in the X direction.

Further, balls 42 are held at multiple contact points by ball housings 13b of second stage 13 and ball housings 12b of first stage 12. Thus, balls 42 roll stably in the X direction.

AF supporting part 15 is composed of the balls. In the present embodiment, three balls are arranged in the Z direction. AF supporting part 15 is interposed between ball housings 111d of lens holder 111 and ball fixing portions 12e of first stage 12 in a state of being rollable.

AF driving part 14 is actuators that move AF movable part 11 in the Z-direction. AF driving part 14 is composed of first AF driving part 14A (first Z-direction driving part) and second AF driving part 14B (second Z-direction driving part). Like OIS driving parts 30, each of AF driving parts 14 is composed of an ultrasonic motor. First AF driving part 14A and second AF driving part 14B are fixed to the inner peripheral surface of first stage 12, respectively, along the X direction and Y direction.

Figure 10A:
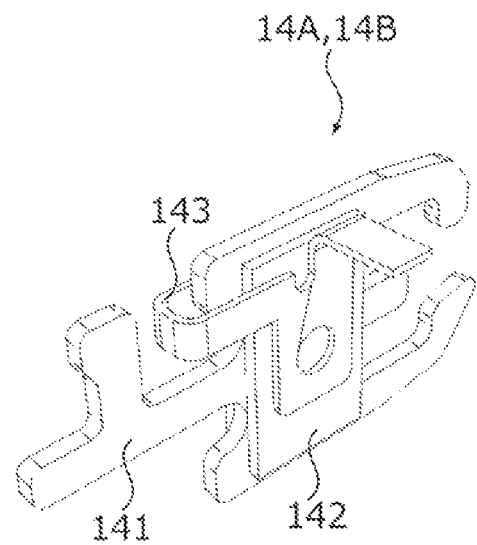
FIGS. 10A and 10B are perspective views of an AF driving part according to Embodiment 1.
Figure 10B:
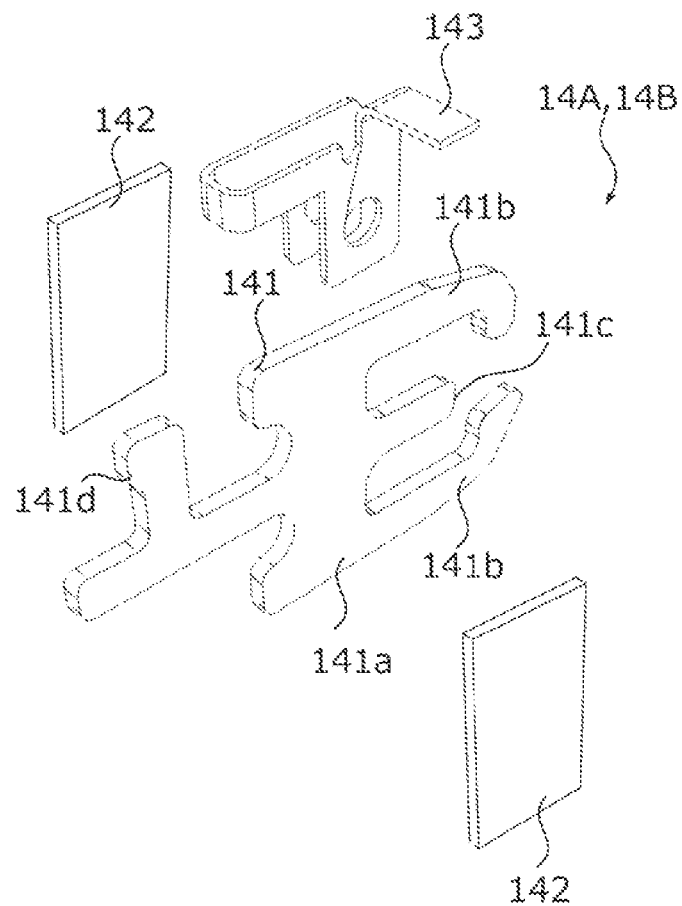

The configuration of AF driving part 14 is illustrated in FIGS. 10A and 10B. FIG. 10A illustrates AF driving part 14 whose members are assembled, and FIG. 10B illustrates AF driving part 14 whose members are disassembled. Note that, although FIGS. 10A and 10B illustrate second AF driving part 14B, the illustrations are treated as illustrations of AF driving parts 14 since the principal configuration of first AF driving part 14A, specifically, the configuration excluding the shape of AF electrode 143, is the same as that of second AF driving part 14B. The configuration of AF driving parts 14 is substantially the same as that of OIS driving parts 30.

As illustrated in FIGS. 10A and 10B, AF driving part 14 includes AF resonant portion 141, AF piezoelectric elements 142, and AF electrode 143. A driving force of AF driving parts 14 is transmitted to lens holder 111 via AF biasing member 112.

AF piezoelectric elements 142 are, for example, plate-shaped elements formed of a ceramic material, and generate a vibration by high-frequency voltage application. Two AF piezoelectric elements 142 are disposed to sandwich body portion 141a of AF resonant portion 141.

AF electrode 143 holds AF resonant portion 141 and AF piezoelectric elements 142 in between, and applies a voltage to AF piezoelectric elements 142.

AF resonant portion 141 is formed of a conductive material and resonates with the vibration of AF piezoelectric elements 142 to convert the vibrational motion into a linear motion. In the present embodiment, AF resonant portion 141 includes substantially rectangular body portion 141a sandwiched between AF piezoelectric elements 142, two arm portions 141b extending from upper and lower portions of body portion 141a in the X- or Y-direction, protruding portion 141c extending from the central portion of body portion 141a in the X- or Y-direction, and energization portion 141d extending from the central portion of body portion 141a on the opposite side of protruding portion 141c and electrically connected to the power supply path (interconnections 17 of first stage 12). Two arm portions 141b have symmetrical shapes except for the free end portions, and symmetrically deform in resonance with the vibration of AF piezoelectric elements 142. The free end portions of two arm portions 141b have respective different shapes in order that only one of the free end portions makes contact with AF biasing member 112. Note that, if by devising the shape of AF biasing member 112 only one free end portion can be configured to make contact with AF biasing member 112, the free end portions of two arm portions 141b may have symmetrical shapes.

AF piezoelectric elements 142 are bonded to body portion 141a of AF resonant portion 141 in the thickness direction and are held in between by AF electrode 143, so that these are electrically connected to one another. By connection between power supply plate 18 and AF electrode 143 and connection between interconnections 17 of first stage 12 and energization portion 141d of AF resonant portion 141, a voltage is applied to AF piezoelectric elements 142 and a vibration is thus generated.

Like OIS resonant portion 31, AF resonant portion 141 has at least two resonant frequencies, and deforms in behaviors different between the resonant frequencies. In other words, the entire shape of AF resonant portion 141 is set such that AF resonant portion 141 deforms in behaviors different between the two resonant frequencies.

First AF driving part 14A and second AF driving part 14B are fixed to the inner peripheral surface of first stage 12 along the X direction and Y direction, respectively. In the present embodiment, the tip ends of one arm portions out of two arm portions 141b of first AF driving part 14A and second AF driving part 14B (e.g., arm portions 141b located on the lower side) are brought into contact with AF biasing member 112, and accordingly, AF movable part 11 is moved in the Z direction. Arm portions 141b brought into contact with AF biasing member 112 are referred to as "first arm portions 141b," and arm portions 141b not brought into contact with AF biasing member 112 are referred to as "second arm portions 141b." Note that, in case that both the tip ends of upper and lower two arm portions 141b of AF resonant portion 141 are brought into contact with AF biasing member 112, two arm portions 141b are symmetrically operated, and it is thus impossible to move AF movable part 11 in the Z direction due to slipping.

In the present embodiment, AF driving part 14 moves AF movable part 11 (AF biasing member 112) in the Z direction by making contact with the AF movable part only at first arm portions 141b. The driving force transmitted is halved as compared with the case of OIS driving part 30 where the driving force is transmitted using two arm portions 31b. For this reason, two AF driving parts 14 are disposed to ensure the driving force for movement in the optical-axis direction.

Figure 11A:
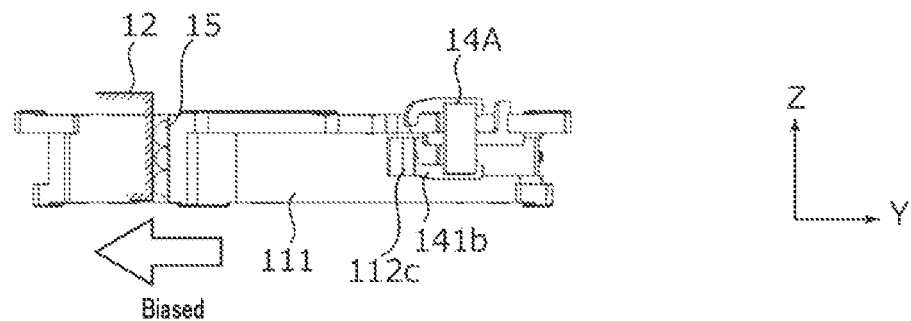
FIGS. 11A and 11B illustrate a first stage, the AF driving part, and the AF supporting part according to Embodiment 1 assembled to one another.
Figure 11B:
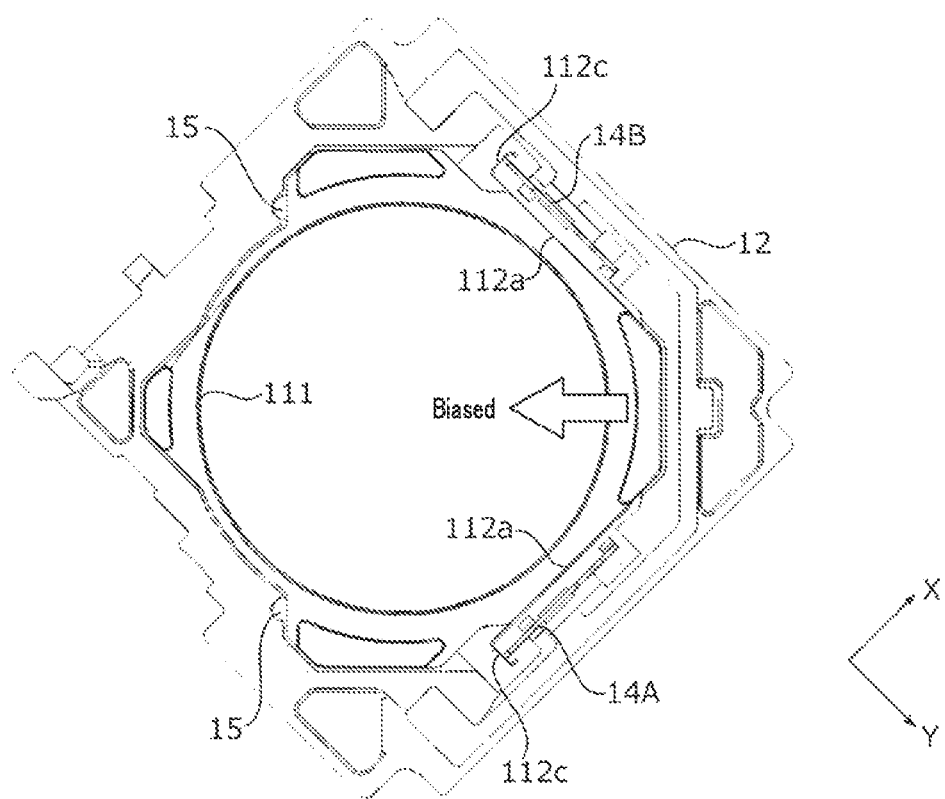

When AF driving part 14 is brought into contact with AF biasing member 112 after assembly of the AF unit, AF biasing member 112 functions as a leaf spring, and AF movable part 11 (lens holder 111) is adapted to be biased to first stage 12 (AF fixing part) via AF supporting part 15 (see FIGS. 11A and 11B).

Specifically, first arm portions 141b of first and second AF driving parts 14A and 14B make contact respectively with both end portions of AF biasing member 112 to bias lens holder 111 with respect to the first stage (AF fixing part) in a single direction in the optical-axis-orthogonal plane. In the embodiment, lens holder 111 is pressed by AF biasing member 112 and is biased with respect to the first stage (AF fixing part) in the intermediate direction between the X- and Y-directions.

By this biasing force, AF biasing member 112 is pressed against the tip ends of arm portions 141b of AF resonant portions 141, and the driving force from AF resonant portions 141 is efficiently transmitted to AF biasing member 112. Further, AF biasing member 112 has both of the function of transmitting the driving force of AF driving part 14 and the function of biasing AF movable part 11 with respect to first stage 12. Thus, the component configuration is simplified.

Further, AF supporting part 15 is disposed at two positions corresponding to first and second AF driving parts 14A and 14B. AF movable part 11 is biased toward first stage 12 via AF supporting part 15 disposed in two places. Thu, AF movable part 11 is held in a stable attitude.

AF driving parts 14 and AF biasing member 112 are only in contact with each other in a biased state; hence, it is possible to lengthen the movement distance (stroke) of AF movable part 11 easily only by enlarging a contact portion in the Z-direction, without preventing height reduction for lens driving device 1. However, the movement distance of AF movable part 11 is restricted to such an extent that AF biasing member 112 does not come into contact with other arm portions 141b of AF resonant portions 141 that are not associated with the movement of AF movable part 11 (e.g., arm portions 141b located on the upper side).

Further, first arm portions 141b of AF resonant portions 141 are in contact with AF biasing member 112 that is a metal molded article. Thus, it is possible to more efficiently transmit the driving force of AF driving part 14 as compared with the case where first arm portions 141b are in contact with lens holder 111 that is a resin molded article.

In lens driving device 1, when a voltage is applied to AF driving part 14, AF piezoelectric elements 142 vibrate, and AF resonant portions 141 deform in a behavior corresponding to the frequency. At this time, a voltage is applied so that first AF driving part 14A and second AF driving part 14B show the same behavior. The driving force of AF driving part 14 causes sliding of AF biasing member 112 in the Z-direction. Accordingly, AF movable part 11 moves in the Z-direction, and focusing is performed. Since AF supporting part 15 is composed of balls, AF movable part 11 can move smoothly in the Z-direction.

In lens driving device 1, when a voltage is applied to OIS driving part 30, OIS piezoelectric elements 32 vibrate, and OIS resonant portion 31 deforms in a behavior corresponding to the frequency. The driving force of OIS driving part 30 causes sliding of OIS power transmission part 34 in the X- or Y-direction. Accordingly, OIS movable part 10 moves in the X- or Y-direction, and shake correction is performed. Since OIS supporting part 40 is composed of balls, OIS movable part 10 can move smoothly in the X- or Y-direction.

Specifically, when first OIS driving part 30X is driven and OIS power transmission part 34 moves in the X-direction, power is transmitted to second stage 13 from first stage 12 in which first OIS driving part 30X is disposed. At this time, balls 41 (three balls housed in ball housing 21f) sandwiched between second stage 13 and base 21 are incapable of rolling in the X-direction, and the position of second stage 13 with respect to base 21 in the X-direction is maintained. On the other hand, balls 42 sandwiched between first stage 12 and second stage 13 are capable of rolling in the X-direction, first stage 12 moves with respect to second stage 13 in the X-direction. That is, second stage 13 serves as a component of OIS fixing part 20, and first stage 12 serves as components of OIS movable part 10.

Further, when second OIS driving part 30Y is driven and OIS power transmission part 34 moves in the Y-direction, power is transmitted to second stage 13 from base 21 where second OIS driving part 30Y is disposed. At this time, balls 42 sandwiched between first stage 12 and second stage 13 are incapable of rolling in the Y-direction, and the position of first stage 12 with respect to the second stage in the Y-direction is maintained. On the other hand, balls 41 (three balls housed in ball housing 21f) sandwiched between second stage 13 and base 21 are capable of rolling in the Y-direction, second stage 13 moves with respect to base 21 in the Y-direction. First stage 12 also moves in the Y-direction following second stage 13. That is, base 21 serves as a component of OIS fixing part 20, and the AF unit including first stage 12 and second stage 13 serves as a component of OIS movable part 10.

As described above, OIS movable part 10 sways in the XY plane, and shake correction is performed. Specifically, an energization voltage to OIS driving parts 30X and 30Y is controlled based on a detection signal indicative of an angular shake from a shake detection part (for example, a gyro sensor (not illustrated)) such that the angular shake of camera module A is canceled. In this case, it is possible to accurately control the translational movement of OIS movable part 10 by feeding back the detection result of the XY position detection part composed of magnets 16X and 16Y and magnetic sensors 25X and 25Y.

As is understood, lens driving device 1 according to the embodiment includes first stage 12 (first fixing part), AF movable part 11 (first movable part) spaced apart from first stage 12, AF supporting part 15 (first supporting part) for supporting AF movable part 11 with respect to first stage 12, AF driving part 14 (Z-direction driving part) disposed on first stage 12 and configured to move AF movable part 11 with respect to first stage 12 in the optical-axis direction. AF driving part 14 includes AF piezoelectric elements 142 and AF resonant portion 141 and is composed of an ultrasonic motor for converting a vibrational motion into a linear motion. AF resonant portion 141 includes body portion 141a sandwiched by AF piezoelectric elements 142, and first and second arm portions 141b extending from body portion 141a in the same direction. First and second arm portions 141b are deformed in resonance with the vibration of the AF piezoelectric elements, and only first arm portion 141b is in contact with AF movable part 11.

According to lens driving device 1, since AF driving part 14 is composed of an ultrasonic motor, it is possible to reduce an influence of external magnetism, and to reduce the size and height. Therefore, even when camera modules A having lens driving device 1 are disposed close to each other as in smartphone M, no magnetic influence is caused. Thus, the lens driving device is extremely suitable for use in a dual camera.

Further, in lens driving device 1, AF movable part 11 is biased to the first stage (AF fixing part) via AF supporting part 15. Thus, it is possible to efficiently transmit the driving force of AF driving part 14 to AF movable part 11.

Embodiment 2

Figure 12A:
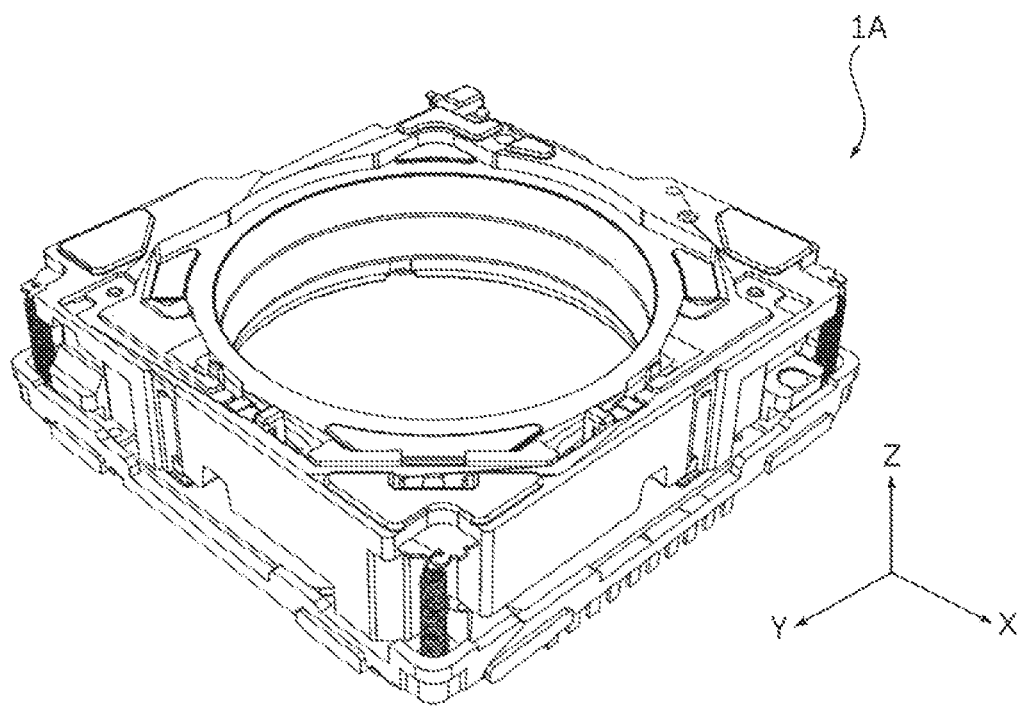
FIGS. 12A and 12B are external perspective views of the lens driving device according to Embodiment 2.
Figure 12B:
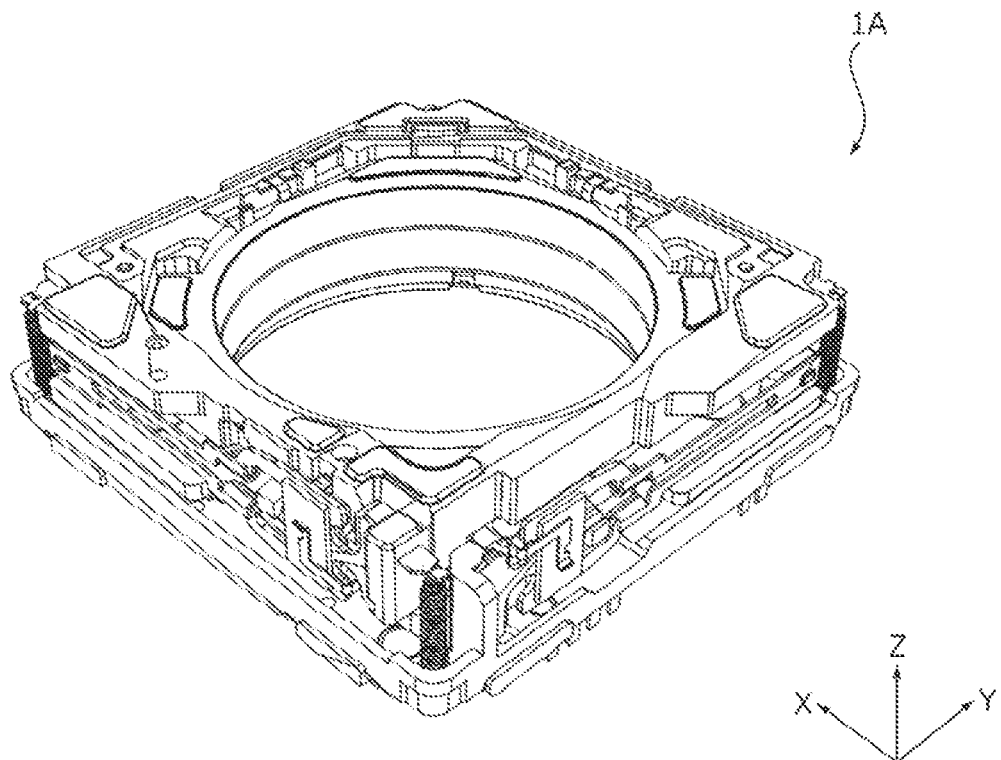

FIGS. 12A and 12B are external perspective views of lens driving device 1A according to Embodiment 2. FIG. 12B illustrates lens driving device 1A rotated 180° around the Z-axis from the state of FIG. 12A. Lens driving device 1A according to Embodiment 2 is substantially the same as lens driving device 1 according to Embodiment 1 except for the configuration of OIS movable part 10A. The same or corresponding components as or to those of lens driving device 1 according to Embodiment 1 are provided with the same reference numerals, and descriptions of such components are omitted. Here, a description will be given of OIS movable part 10A (in particular, AF movable part 51).

Figure 13:
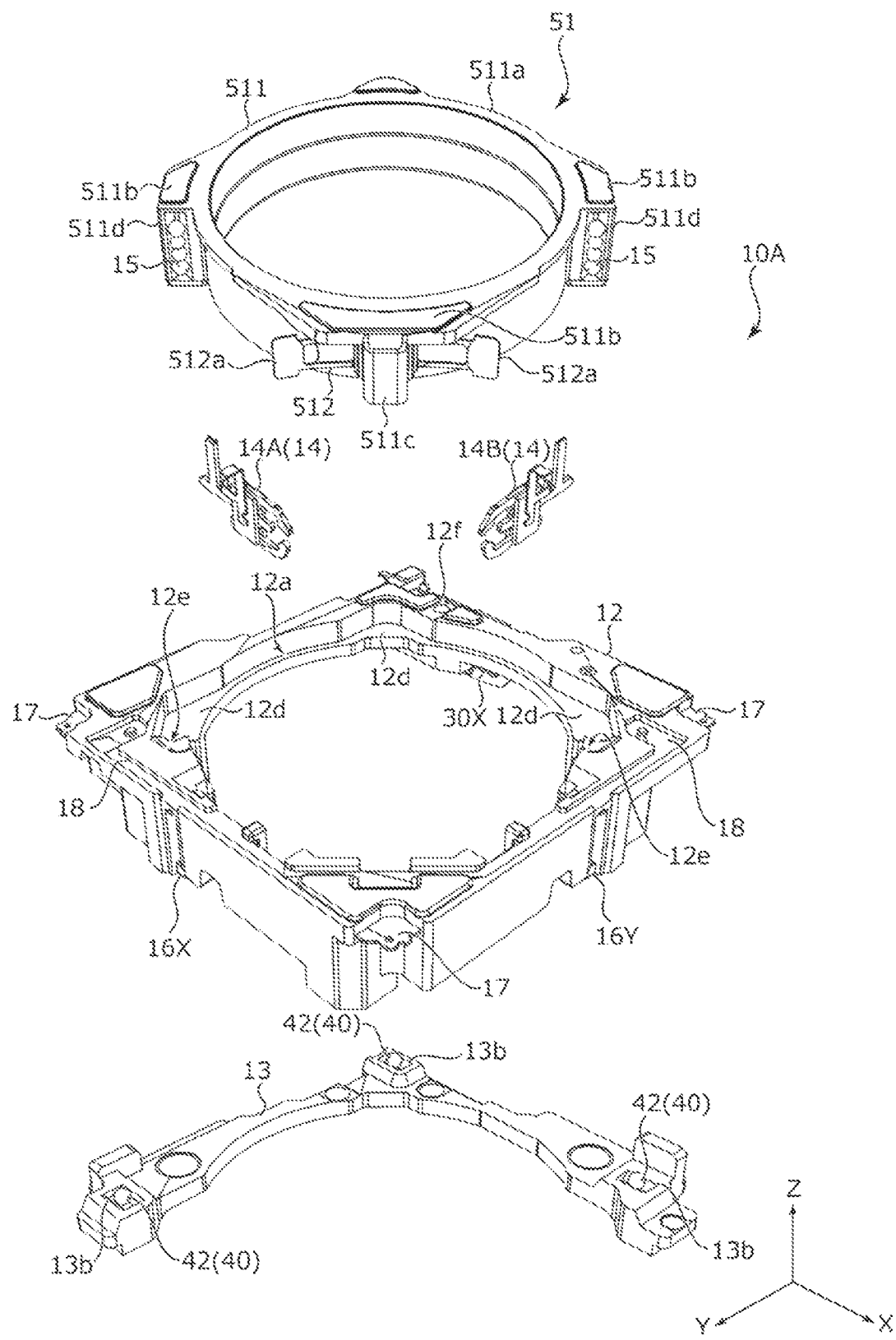
FIG. 13 is an exploded perspective view of the OIS movable part according to Embodiment 2.
Figure 14:
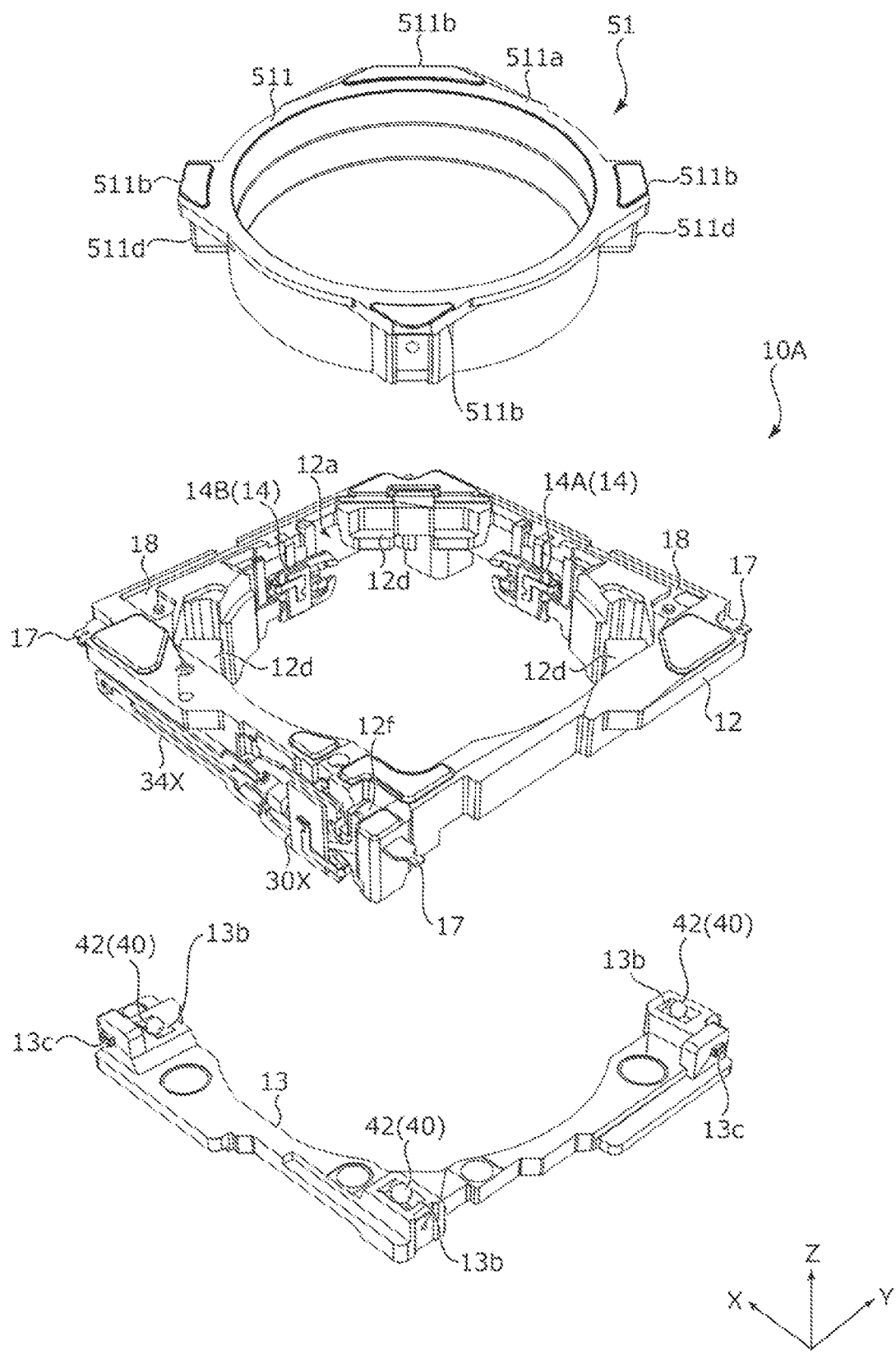
FIG. 14 is an exploded perspective view of the OIS movable part according to Embodiment 2.
Figure 15:
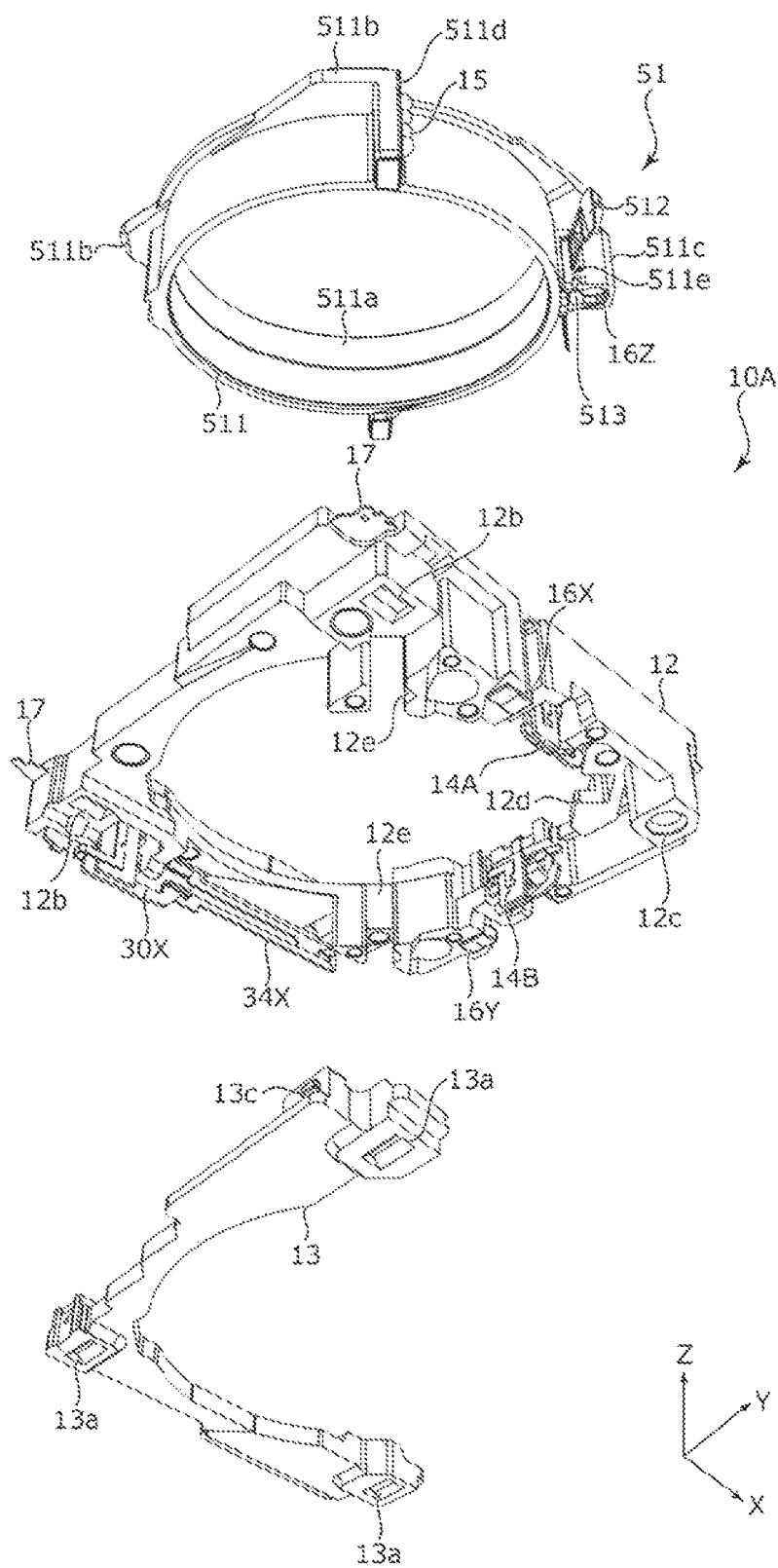
FIG. 15 is an exploded perspective view of the OIS movable part according to Embodiment 2.

FIGS. 13 to 15 are exploded perspective views of OIS movable part 10. FIG. 14 illustrates OIS movable part 10 rotated 180° around the Z-axis from the state of FIG. 13. FIG. 15 is a lower perspective view illustrating OIS movable part 10 rotated 90° around the Z-axis from the state of FIG. 13.

As illustrated in FIGS. 13 to 15, in Embodiment 2, OIS movable part 10A includes AF movable part 51, first stage 12, second stage 13, AF driving part 14, AF supporting part 15, and the like. For the movement in the Y-direction, entire OIS movable part 10A including first stage 12 and second stage 13 is a movable body, whereas for the movement in the X-direction, second stage 13 functions as OIS fixing part 20 and only the AF unit functions as OIS movable part 10. Further, first stage 12 functions as an AF fixing part.

AF movable part 51 is a part that moves in the optical-axis direction at the time of focusing. AF movable part 51 is disposed to be spaced radially inward from first stage 12 (AF fixing part), and is supported to first stage 12 via AF supporting part 15.

AF movable part 51 includes lens holder 511 and AF biasing member 512 for holding lens part 2 (see FIG. 2).

Lens holder 511 is formed of, for example, polyarylate (PAR), a PAR alloy that is a mixture of multiple resin materials containing PAR, a liquid crystal polymer, or the like. Lens holder 511 includes cylindrical lens housing 511a. Lens part 2 (see FIG. 2) is fixed to lens housing 511a, for example, by adhesion.

Lens holder 511 includes upper flanges 511b at an upper outer peripheral edge of lens housing 511a. In Embodiment 2, four upper flanges 511b are disposed at positions corresponding to four corners of lens driving device 1A. Upper flanges 511b function as a restricting portion for restricting the movement of lens holder 511 to the image formation side in the optical-axis direction.

Magnet housing 511c for housing magnet 16Z for Z position detection is disposed on one of four upper flanges 511b. Magnet 16Z is disposed in magnet housing 511c, and a magnetic sensor (for example, a Hall device, a TMR sensor, or the like) (not illustrated) for Z-position detection is disposed at a position facing magnet 16Z of sensor board 22 (see FIG. 4) in the optical-axis direction. Note that, in place of magnet 16Z and the magnetic sensor (not illustrated), an optical sensor such as a photoreflector may detect the position of AF movable part 51 in the Z-direction.

Lens holder 511 includes, in the peripheral surface of lens housing 511a, ball housings 511d for housing AF supporting part 15. In Embodiment 2, ball housings 511d are disposed at two places that are line symmetric with respect to one diagonal direction (intermediate direction between the X direction and the Y direction) so that the ball housings are open on the same side (the side on which AF biasing member 512 is disposed) with respect to the other diagonal direction.

AF biasing member 512 is formed of a metal material such as, for example, titanium copper, nickel copper, stainless steel. AF biasing member 512, for example, is composed of a flat dumbbell-shaped leaf spring. AF driving parts 14A and 14B make contact with both longitudinal end portions 512a of AF biasing member 512. Further, the spring constant of AF biasing member 512 is adjusted by lightening.

AF biasing member 512 is disposed in space 511e formed between magnet housing 511c and lens housing 511a, and is sandwiched by spacer 513 and magnet housing 511c. AF biasing member 512 extends so as to make contact with lens housing 51a.

First AF driving part 14A and second AF driving part 14B are fixed to the inner peripheral surface of first stage 12 along the X direction and Y direction, respectively. In Embodiment 2, the tip ends of the one arms out of two arm portions 141b of first AF driving part 14A and second AF driving part 14B (e.g., arm portion 141b located on the upper side) are brought into contact with AF biasing member 512, and accordingly, AF movable part 51 is moved in the Z direction. Arm portions 141b brought into contact with AF biasing member 512 are referred to as "first arm portions 141b," and arm portions 141b not brought into contact with AF biasing member 112 are referred to as "second arm portions 141b." Note that, in case that both the tip ends of upper and lower two arm portions 141b of AF resonant portion 141 are brought into contact with AF biasing member 112, two arm portions 141b are symmetrically operated, and it is thus impossible to move AF movable part 11 in the Z direction due to slipping.

In Embodiment 2, AF driving part 14 moves AF movable part 11 (AF biasing member 112) in the Z direction by making contact with the AF movable part only at first arm portions 141b. The driving force transmitted is halved as compared with the case of OIS driving part 30 where the driving force is transmitted using two arm portions 31b. For this reason, two AF driving parts 14 are disposed to ensure the driving force for movement in the optical-axis direction.

Figure 16A:
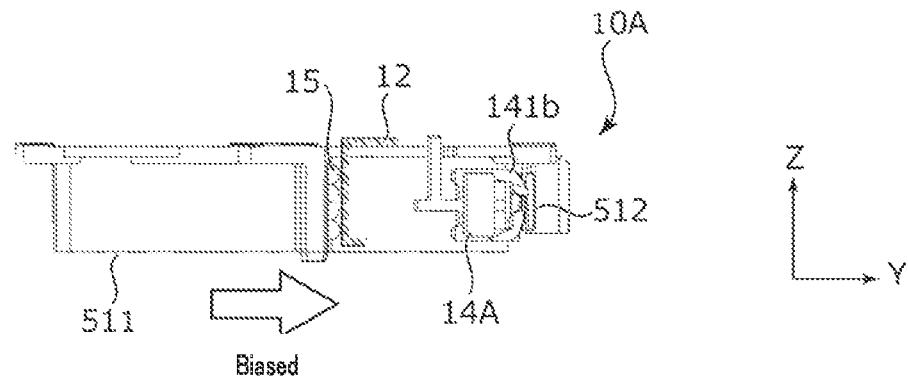
FIGS. 16A and 16B are diagrams illustrating the first stage, the AF driving part, and the AF supporting part according to Embodiment 2 assembled.
Figure 16B:
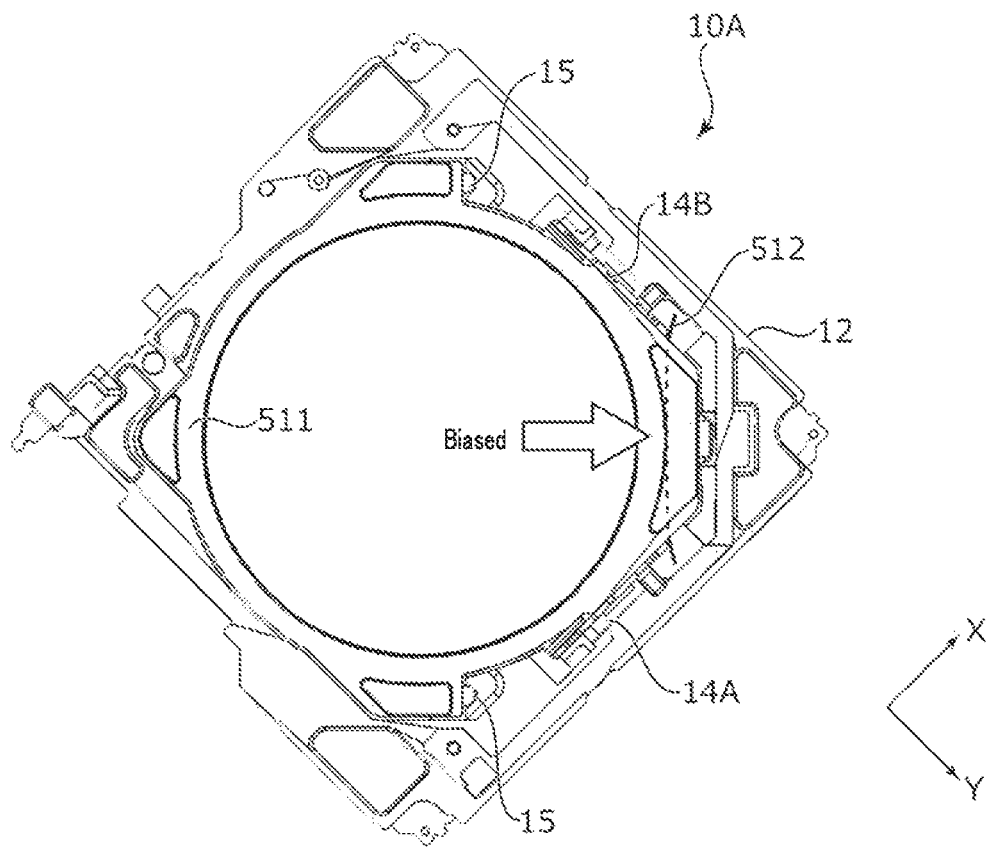

When AF driving parts 14 are brought into contact with AF biasing member 512 after assembly of the AF unit, AF biasing member 512 functions as a leaf spring, and AF movable part 51 is adapted to be biased to first stage 12 (AF fixing part) via AF supporting part 15 (see FIGS. 16A and 16B).

Specifically, first arm portions 141b of first and second AF driving parts 14A and 14B make contact with both end portions of AF biasing member 512 to bias lens holder 111 with respect to the first stage (AF fixing part) in a single direction in the optical-axis-orthogonal plane. In Embodiment 2, lens holder 111 is pulled by AF biasing member 512 and is biased with respect to the first stage (AF fixing part) in the intermediate direction between the X- and Y-directions.

By this biasing force, AF biasing member 512 is pressed against the tip ends of arm portions 141b of AF resonant portions 141, and the driving force from AF resonant portions 141 is efficiently transmitted to AF biasing member 512. Further, AF biasing member 512 has both of the function of transmitting the driving force of AF driving parts 14 and the function of biasing AF movable part 51 with respect to first stage 12. Accordingly, the component configuration is simplified.

Further, in Embodiment 2, AF biasing member 512 is composed of the flat dumbbell-shaped plate spring, and a large biasing force is exerted. Thus, subduction of AF movable part 51 due to its own weight is suppressed, and the attitude of AF movable part 51 with respect to first stage 12 is stabilized. Therefore, it is possible to transmit the driving force of AF driving parts 14 to AF movable part 51 efficiently, and to achieve an improved response.

Further, AF supporting part 15 is disposed at two positions corresponding to first and second AF driving parts 14A and 14B. AF movable part 11 is biased toward first stage 12 via AF supporting part 15 disposed in two places. Thu, AF movable part 51 is held in a stable attitude.

AF driving parts 14 and AF biasing member 512 are only in contact with each other in a biased state; hence, it is possible to lengthen the movement distance (stroke) of AF movable part 51 easily only by enlarging a contact portion in the Z-direction, without preventing height reduction for lens driving device 1A. However, the movement distance of AF movable part 51 is restricted to such an extent that AF biasing member 512 does not come into contact with other arm portions 141b of AF resonant portions 141 that are not associated with the movement of AF movable part 51 (e.g., arm portions 141b located on the lower side).

Further, first arm portions 141b of AF resonant portions 141 are in contact with AF biasing member 512 that is a metal molded article. Thus, it is possible to more efficiently transmit the driving force of AF driving part 14 as compared with the case where first arm portions 141b are in contact with lens holder 111 that are a resin molded article.

As is understood, lens driving device 1A according to Embodiment 2 includes first stage 12 (first fixing part), AF movable part 51 (first movable part) spaced apart from first stage 12, AF supporting part 15 (first supporting part) for supporting AF movable part 51 with respect to first stage 12, AF driving parts 14 (Z-direction driving parts) disposed on first stage 12 and move AF movable part 51 with respect to first stage 12 in the optical-axis direction. Each of AF driving parts 14 includes AF piezoelectric elements 142 and AF resonant portion 141 and is composed of an ultrasonic motor for converting a vibrational motion into a linear motion. AF resonant portion 141 includes body portion 141a sandwiched by AF piezoelectric elements 142, and first and second arm portions 141b extending from body portion 141a in the same direction. First and second arm portions 141b are deformed in resonance with the vibration of AF piezoelectric elements 142, and only first arm portion 141b is in contact with AF movable part 51 (AF biasing member 512)

According to lens driving device 1A, since AF driving part 14 is composed of an ultrasonic motor, it is possible to reduce an influence of external magnetism, and to reduce the size and height. Therefore, even when camera modules A having lens driving device 1 are disposed close to each other as in smartphone M, no magnetic influence is caused. Thus, the lens driving device is extremely suitable for use in a dual camera.

Further, in lens driving device 1A, AF movable part 51 is biased to the first stage (AF fixing part) via AF supporting part 15. Thus, it is possible to efficiently transmit the driving force of AF driving parts 14 to AF movable part 51.

[Control Method for Driving Unit]

In lens driving device 1 according to Embodiment 1 and lens driving device 1A according to Embodiment 2, AF driving parts 14 and OIS driving part 30 (driving unit) are controlled, for example, as follows. In the driving unit illustrated below, "active element C-1" corresponds to AF resonant portion 141 and OIS resonant portion 31, and "passive element C-4" corresponds to AF biasing members 112 and 512 and OIS power transmission part 34.

Figure 17:
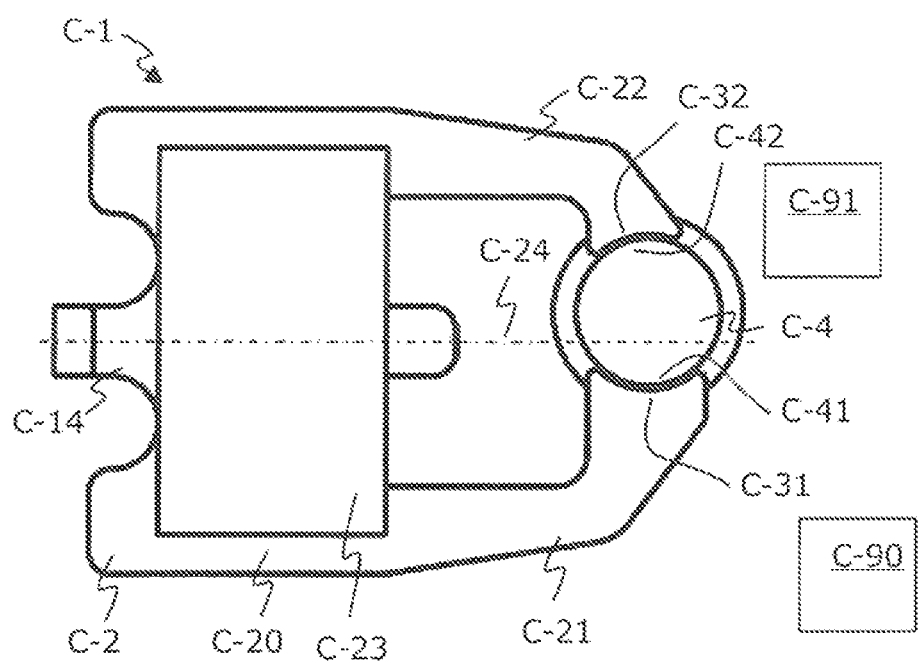
FIG. 17 illustrates a driving unit for driving vibration.

In principle, in the figures, identical or functionally identical parts are provided with the same reference symbols. FIG. 17 illustrates a driving unit including active element C-1. Active element C-1 includes resonator C-2 (corresponding to AF resonant portion 141 and OIS resonant portion 31) having a pair of arms, first arm C-21 and second arm C-22. Arms C-21 and C-22 and attachment portion C-14 are connected to coupling portion C-20 of resonator C-2. Resonator C-2 is mounted on another part, such as a base element, via attachment portion C-14.

Excitation section C-23 such as piezoelectric elements (corresponding to AF piezoelectric elements 142 and OIS piezoelectric elements 32) are disposed on coupling portion C-20. Controller C-90 is disposed to generate an excitation signal or excitation voltage for driving excitation section C-23. Sensor C-91 is disposed to measure the position and/or velocity of passive element C-4 relative to active element C-1. Sensor C-91 measures the position and/or velocity of passive element C-4 based on the magnetic field affected by the position of passive element C-4. A Hall sensor can be applied as sensor C-91.

Excitation section C-23 include two separate elements disposed on both sides of excitation section C-23. Resonator C-2 and excitation section C-23 are flat elements stacked on one another and extend parallel to reference plane C-28 (see FIG. 19).

When excited by an alternating voltage of an excitation frequency, arms C-21 and C-22 vibrate and first contact portion C-31 of first arm C-21 performs a substantially linear motion depending on the frequency. The linear vibration can have orthogonal components and the overall motion can be regarded as being elliptical. Depending on the frequency, the direction of the linear vibrational (reciprocating) motion changes. First contact portion C-31 repeatedly makes contact with first contact region C-41 of passive element C-4 and drives the passive element relative to active element C-1. The same applies to second contact portion C-32 and second contact region C-42.

Depending on the direction of linear reciprocating motion, passive element C-4 is repeatedly pushed in a corresponding direction to perform, for example, linear and/or rotational motion depending on how passive element C-4 is suspended. In the embodiment illustrated in FIG. 17, passive element C-4 rotates relative to active element C-1.

Considering the specific geometric shapes of these portions and the arrangement for passive element C-4 to move relative to active element C-1, the excitation frequency resulting in the maximum energy transmission for a desired motion can be judged for a desired (rotational or linear) motion direction for each vibration or each pulse and for each consequent pressing motion. To reduce energy transmission per pulse, the excitation frequency can be varied slightly such that a schematic direction of the vibrational motion is maintained the same, although it slightly changes. Accordingly, the contact angles at which first contact portion C-31 and second contact portion C-32 make contact with respective contact regions 41 and 42, and the amplitudes of the vibrations of the contact portions change. Consequently, the energy transmitted for each pulse is reduced as compared to the case of optimum angles. As is understood, a slight relative change in the excitation frequency can be utilized to control the moving speed of passive element C-4.

Prestressing forces act between first contact portion C-31 and first contact region C-41, and between second contact portion C-32 and second contact region C-42, respectively. The prestressing forces are generated by the elasticity of first arm C-21 and second arm C-22. When passive element C-4 is disposed between first contact portion C-31 and second contact portion C-32, first arm C-21 and second arm C-22 are pushed apart from each other.

First arm C-21 and second arm C-22 extend substantially symmetrically from coupling portion C-20, but may differ in their shapes, in particular in the details of the shape, when the arms are manufactured from flat pieces of materials. Resonator axis C-24 corresponds to an axis of symmetry with respect to which resonator C-2, particularly coupling portion C-20, and first and second arms C-21 and C-22, except for the details of the arms described above, can be mirrored. When excited by excitation section C-23, the motion of coupling portion C-20 and arms C-21 and C-22 is substantially symmetrical with respect to the same axis of symmetry. A node of this motion, i.e., the minimal motion region, is located on resonator axis C-24. Attachment portion C-14 for mounting active element C-1 to another element is located also on resonator axis C-24.

Figure 18A:
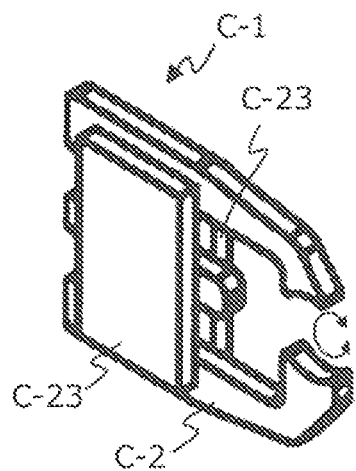
FIGS. 18A and 18B illustrate the driving unit for driving vibration.
Figure 18B:
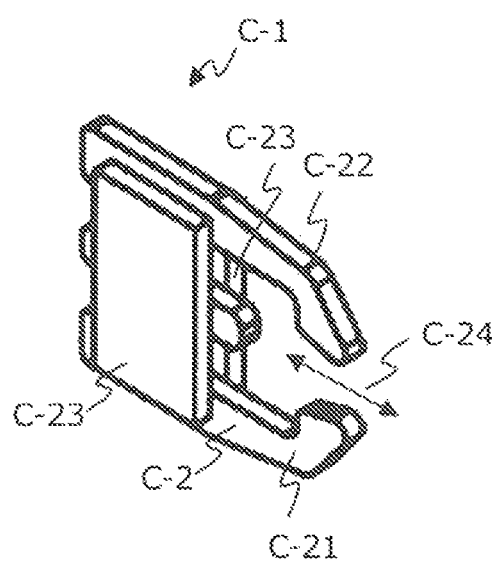

FIGS. 18A and 18B illustrate a variation of active element C-1, in which illustration of passive element C-4 is omitted for clarity. FIG. 18A illustrates active element C-1 as illustrated in FIG. 17. In FIG. 18B, active element C-1 is located to drive the passive element linearly, particularly in a plane in which two arms C-21 and C-22 are located, as indicated by the bi-directional arrow corresponding to resonator axis C-24. In FIGS. 18A and 18B, excitation section C-23 are attached to both sides of resonator C-2.

Figure 19:
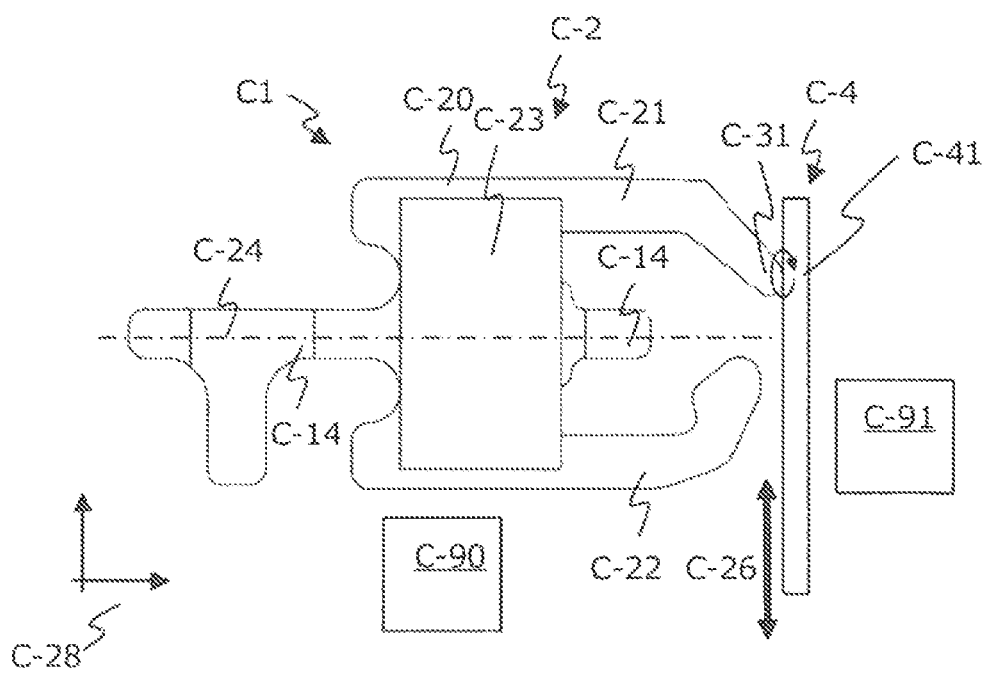
FIG. 19 illustrates the driving unit for driving vibration.

FIG. 19 illustrates a driving unit having essentially the same elements as the driving unit illustrated in FIG. 17. Although this driving unit also includes a pair of arms C-21 and C-22, only first arm C-21 makes contact with passive element C-4 to drive passive element C-4. The motion of the driving unit is linear, as indicated by linear motion axis C-26.

In the embodiment described above, passive element C-4 is disposed between arms C-21 and C-22, and both of contact portions C-31 and C-32 at the end portions of the arms are pointed inward. In another embodiment, although not illustrated, arms C-21 and C-22 are shaped such that contact portions C-31 and C-32 are pointed outward in directions away from each other. Passive element C-4 is disposed to make contact with one or both of contact portions C-31 and C-32 from the outside.

Further embodiments of the driving unit to which the driving method presented in the present specification can be applied are disclosed in WO2006/000118, U.S. Pat. No. 7,429,812, and WO2019/068708, which are incorporated herein by reference in their entirety.

Figure 20:
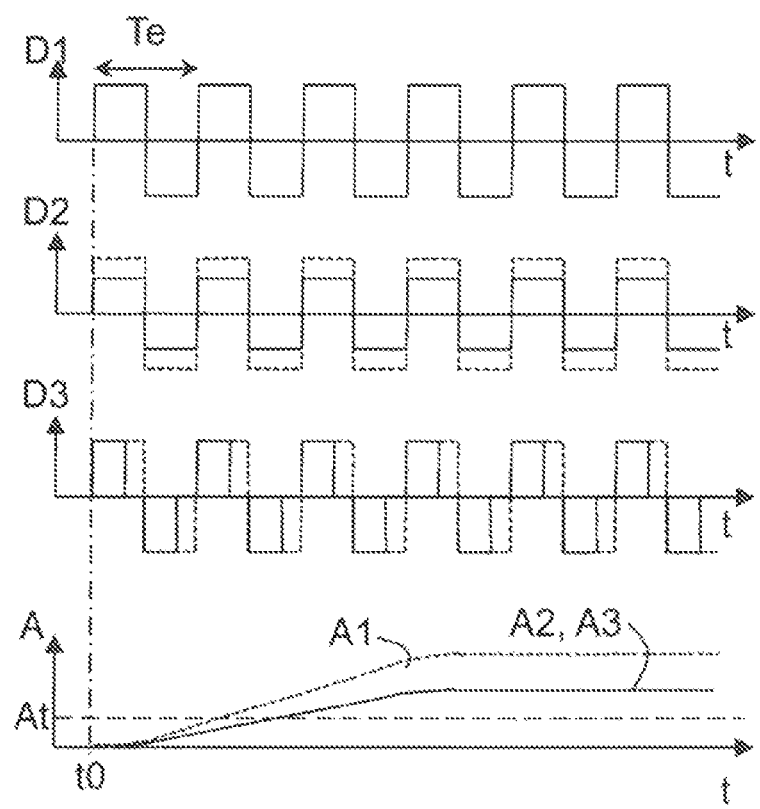
FIG. 20 illustrates drive signals obtained when the shape of a drive pulse is adjusted and resulting vibration amplitude.

FIG. 20 illustrates three drive signals D1, D2, and D3 and amplitudes A1, A2, and A3 of vibrations by corresponding active elements C-1 along same time axis t.

First drive signal D1 is a rectangular signal with cycle length Te, also referred to as a pulse cycle, and excitation frequency fe is represented by fe=1/Te. The maximum pulse width of first drive signal D1 is Te/2; i.e., pulse duty cycle dp is 50%.

Assuming that the pulse sequence of first drive signal D1 begins at starting time t0, first amplitude A1 of a corresponding vibration increases as subsequent pulses by excitation section C-23 transmit the mechanical energy to the vibration of active element C-1, particularly of resonator C-2 and arms C-21 and C-22 thereof. After multiple pulses, the vibration becomes maximum and then becomes essentially constant in a steady state.

In case that first amplitude A1 is below activation threshold At, arms C-21 and C-22 do not apply a driving force to passive element C-4. In case that first amplitude A1 is above activation threshold At, arms C-21 and C-22 apply a driving force to passive element C-4 and passive element C-4 is driven relative to active element C-1. The same applies to second amplitude A2 and third amplitude A3.

Second drive signal D2 is a signal obtained by amplitude modulation on first drive signal D1, and has a reduced amplitude with respect to the maximum value (the amplitude of first drive signal D1). Third drive signal D3 is a signal obtained by pulse width modulation on first drive signal D1, and has a reduced pulse width or pulse duty cycle with respect to the maximum value (pulse width or pulse duty cycle of first drive signal D1). In both cases of second drive signal D2 and third drive signal D3, the mechanical energy transmitted to active element C-1 per pulse decreases as compared to the case of first drive signal D1. Thus, the trajectories of second amplitude A2 and third amplitude A3 rise slowly as compared to first amplitude A1 and become flat at a lower constant or steady value. The time required to exceed activation threshold At is longer than in the case of first drive signal D1.

The amplitude of vibration by active element C-1 corresponds to the moving speed of passive element C-4 relative to active element C-1. That is, the greater the amplitude of the vibration by active element C-1, the faster the moving speed of passive element C-4 relative to active element C-1. Thus, the operating speed of the driving unit can be controlled by controlling the energy applied to active element C-1 per pulse. The energy applied to active element C-1 per pulse depends on the shape of the pulse, and this shape can be controlled by different types of modulation. For example, pulse amplitude modulation and/or pulse width modulation are well known as the types of modulation.

In case that the energy transmitted to active element C-1 per pulse is too small, such energy may result in a situation where the amplitude of the vibration by active element C-1 does not at all exceed activation threshold At or only occasionally uncertainly exceeds the activation threshold. Therefore, the operating speed of the driving unit cannot be made slower than velocity threshold Vt (see FIG. 22). In general, velocity threshold Vt corresponds to activation threshold At for the amplitude. Velocity threshold Vt may be within a range of from 20% to 40% of the maximum velocity depending on the physical and electrical characteristics of the driving unit.

Figure 22:
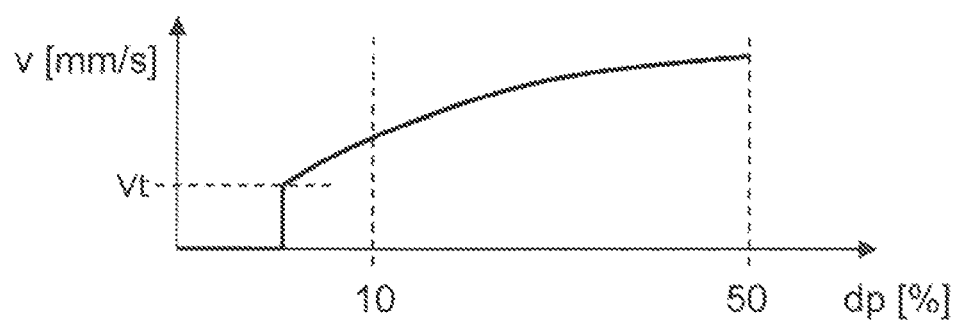
FIG. 22 illustrates a dependency of driving speed v on pulse duty cycle dp.

FIG. 22 illustrates the above by the relationship between the pulse width or pulse duty cycle dp and resulting velocity v. When pulse duty cycle dp is reduced from its maximum of 50%, the operating speed of the driving unit decreases to velocity threshold Vt and becomes zero at pulse duty cycles dp lower than the velocity threshold.

Figure 21:
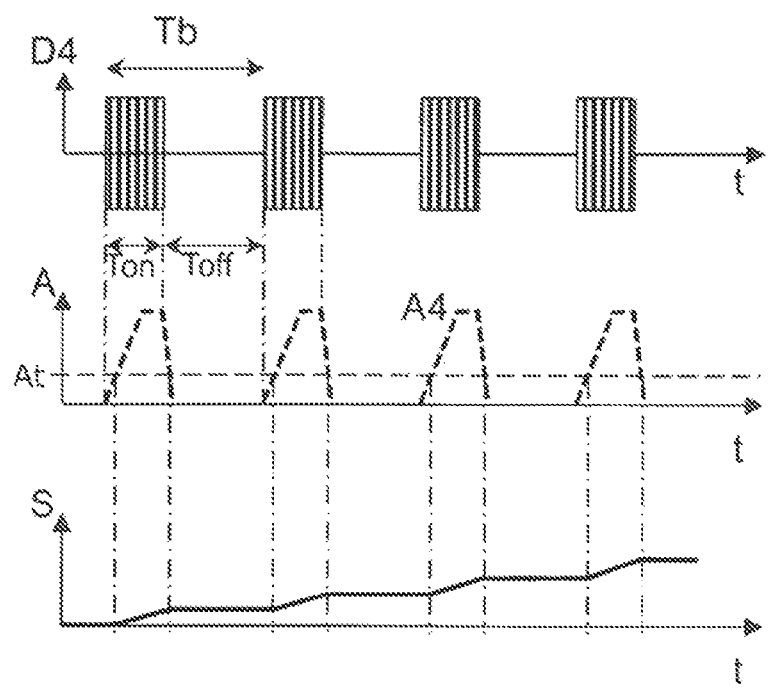
FIG. 21 illustrates drive signals obtained when the presence of a drive pulse is adjusted and resulting vibration amplitude.

To achieve a slower speed, the shape of the drive signal is maintained such that the amplitude of the vibration of the active element in the steady state exceeds activation threshold At by a safety margin. As illustrated in FIG. 21, the driving unit operates intermittently. This figure illustrates fourth drive signal D4, corresponding amplitude A4 of vibration of active element C-1, and corresponding displacement S of passive element C-4 relative to active element C-1 along same time axis t. The time axis is compressed in comparison to the time axis of FIG. 20.

Fourth drive signal D4 includes a pulse in a turn-on period and no pulse in a turn-off period. A sequence with the pulse and a sequence without the pulse are periodically repeated at pulse block cycle Tb that is equal to turn-on time Ton+turn-off time Toff. The pulse block cycle is also referred to as the excitation cycle. Repetition frequency fb=1/Tb corresponding to the pulse block cycle is called the pulse block frequency. The relation between turn-on time Ton and pulse block cycle Tb, i.e., Ton/Tb, is referred to as pulse block duty cycle dpb.

Thus, the driving unit operates intermittently by application of a pulse to the driving unit only during the turn-on period and omission or suppression of the pulse during the turn-off period. During the turn-on period long enough for the amplitude of vibration by active element C-1 to exceed activation threshold At, and after a corresponding delay, passive element C-4 is driven relative to active element C-1. During the turn-off period after the vibration damps, active element C-1 holds passive element C-4 in place by the prestressing force. Displacement S increases by a series of repetitions of steps and of the steady periods. The average slope of displacement S illustrated in FIG. 21 represents the average velocity of passive element C-4 relative to active element C-1.

In general, the velocity refers to the relative motion between active element C-1 and passive element C-4 as viewed along a linear axis. In the case of a rotary driving unit, the angular velocity corresponds to a value obtained by dividing the velocity by the radius when active element C-1 drives passive element C-4.

In a common application, pulse block cycle Tb can correspond to pulse block frequency fb=1/Tb between 5 kHz and 100 kHz (typically around 25 kHz). The frequency of the pulse itself is between 50 kHz and 1,000 kHz (typically around 500 kHz).

Accordingly, the maximum velocity is around 80 mm/sec. The step for each vibration period is in the range of 0.01 to 1 μm. The force exerted by active element C-1 on passive element C-4 is up to 100 mN (i.e., up to 0.1 N). The voltage applied to excitation section C-23 is around 3 V.

In situations where the position of the driving unit needs to be obtained regardless of the velocity, controller C-90 modifies the position step size, which is a position change in one pulse cycle.

For example, such modification is performed by modifying the shape of the drive pulse to reduce the energy transmitted per pulse to reduce the amplitude of the mechanical vibration that drives passive element C-4.

Alternatively, the modification is performed by modifying the excitation frequency to reduce the mechanical vibration to reduce energy transmission to the amplitude and/or to change a contribution to the driving force acting in the direction of mechanical vibration, i.e., the direction of motion of passive element C-4.

Figure 23:
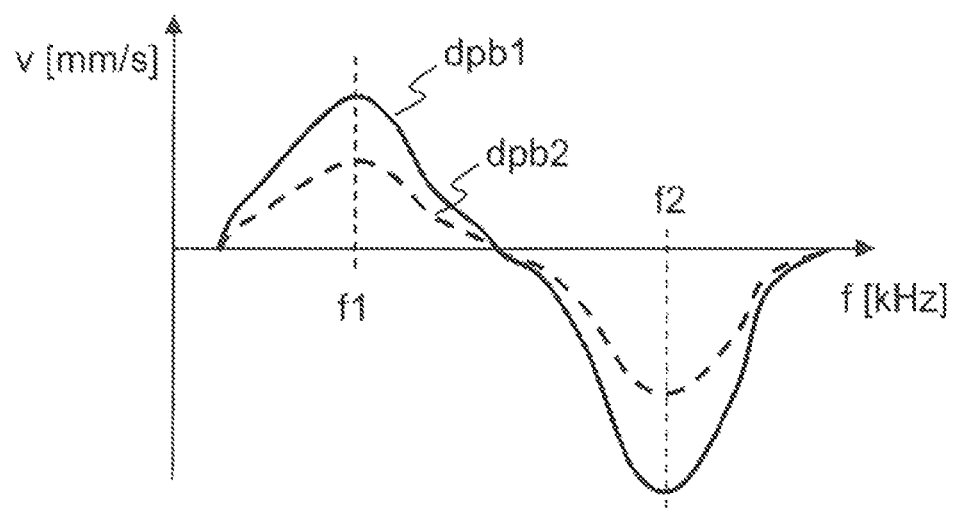
FIG. 23 illustrates a dependency of driving speed v on excitation frequency f.

FIG. 23 illustrates the relationship between excitation frequency f and resulting velocity v. At first frequency f1, resonator C-2 is in a first operation mode or a first vibration mode and drives passive element C-4 in a first direction at a maximum velocity. At second frequency f2, resonator C-2 is in a second operation mode and drives passive element C-4 at a maximum velocity in a second direction opposite to the first direction. When there is a slight deviation around f1 or f2 corresponding to detuning of the excitation frequency with respect to the natural frequency of active element C-1 for each vibration mode, the velocity decreases.

The above example has been described in connection with the drive signal having a rectangular pulse. In particular, with regard to the amplitude and pulse width modulation and pulse omission, the same principle can be applied also to a pulse with a different shape. For example, the same principle can be applied to a sinusoidal, triangular, trapezoidal, or sawtooth pulse, or a pulse with any shape.

Optimum excitation frequencies f1 and f2 for motions in opposing directions, and excitation frequencies for different modes and directions generally depend on the individual mechanical and electrical properties of the driving unit, particularly of resonator C-2 and excitation section C-23. Because of wear and parameter variations, these properties vary over time depending on environmental conditions such as temperature and humidity, and depending on the orientation of the driving unit relative to the direction of gravity. Correspondingly, the optimum value of the excitation frequency also changes. To judge the optimum value, the driving unit can be operated at different frequencies, a response of a target can be measured, and the frequency at which the response of the target is optimal can be judged.

Figure 24:
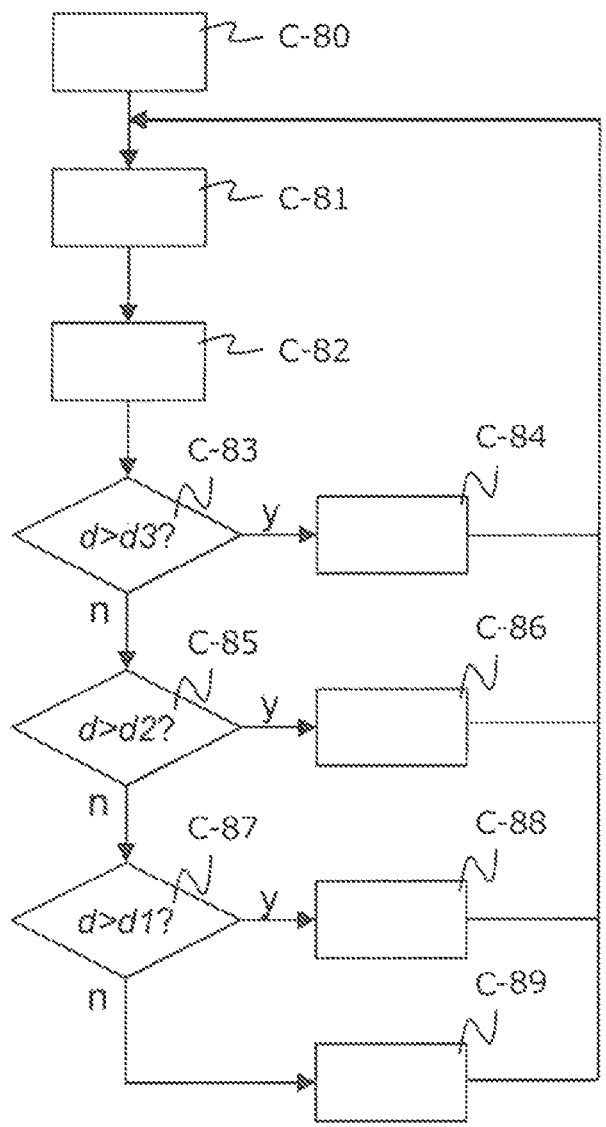
FIG. 24 is a flow diagram illustrating a driving method for the driving unit.

FIG. 24 is a flow chart illustrating a driving-unit operation method according to the embodiment. This process is performed by controller C-90.

At initialization step C-80, the method is started. At measuring step C-81, the actual position of the driving unit, i.e., the relative positions of active element C-1 and passive element C-4, is determined. This position may be a rotational position or a translational position.

At difference calculation step C-82, difference d between the actual position and a set position is calculated. Difference d is represented by a position error signal. Depending on the value of difference d, the method branches into different driving modes. The driving unit is driven by drive signals of different parameters depending on the different thresholds d1<d2<d3 and absolute value abs(d) of difference d.

When abs(d)>d3 (in the case of "y" at judgement step C-83), the driving unit is driven in high-speed driving mode C-84. When d2<abs(d)<d3 (in the case of "n" at judgement step C-83 and "y" at judgement step C-85), the driving unit is driven in medium-speed driving mode C-86. When d1<abs(d)<d2 (in the case of "n" at judgement step C-85 and "y" at judgement step C-87), the driving unit is driven in driven in low-speed driving mode C-88.

In every case, the excitation frequency of the drive signal in the aforementioned example, f1 or f2, is selected depending on the direction in which the position is to be corrected, i.e., depending on the sign of difference d.

When abs(d)<d1 (in the case of "n" at judgement step C-87), the driving unit is not driven. At this time, in braking mode C-89, passive element C-4 is held relative to active element C-1 by a prestressing force.

Then, the steps are iteratively repeated by proceeding with measuring step C-81.

The values for position error thresholds d1 to d3 are selected when designing or ordering the driving unit. These values may be, for example, d1=1 µm, d2=5 µm, and d3=10 µm.

In the embodiment, in high-speed driving mode C-84, the pulse duty cycle for the maximum power of the drive signal is typically 50% and the maximum pulse block duty cycle is typically 100%.

In medium-speed driving mode C-86, for example, the pulse duty cycle of the drive signal is made less than the pulse duty cycle in high-speed driving mode C-84. Alternatively, the pulse block duty cycle of the drive signal may be made less than the pulse block duty cycle in high-speed driving mode C-84.

In the embodiment, both the pulse duty cycle and the pulse block duty cycle are reduced. For example, the pulse duty cycle is 30% (not the maximum of 50%) and the pulse block duty cycle is 50% (not the maximum of 100%).

In low-speed driving mode C-88, for example, the pulse duty cycle of the drive signal is made less than the pulse duty cycle in medium-speed driving mode C-86. Alternatively, the pulse block duty cycle of the drive signal may be made less than the pulse block duty cycle in medium-speed driving mode C-86.

In the embodiment, both the pulse duty cycle and the pulse block duty cycle are reduced. For example, the pulse duty cycle is 20% (less than the pulse duty cycle in medium-speed driving mode C-86) and the pulse block duty cycle is 10% (less than the pulse block duty cycle in medium-speed driving mode C-86).

Thus, in the embodiment, the pulse duty cycle of the drive signal is 50% and the pulse block duty cycle is 100% in high-speed driving mode C-84. The pulse duty cycle of the drive signal is 30% and the pulse block duty cycle is 50% in medium-speed driving mode C-86. The pulse duty cycle of the drive signal is 20% and the pulse block duty cycle is 10% in low-speed driving mode C-88.

Although the embodiment has been described in which the operation of the driving unit is controlled using three drive modes of high-speed driving mode C-84, medium-speed driving mode C-86, and low-speed driving mode C-88 between which the speeds are different, the operation of the driving unit may be controlled using only two drive modes between which the speeds are different.

Further, although the embodiment has been described in connection with the case of controlling the operating speed of the driving unit by changing the pulse duty cycle and the pulse block duty cycle, the pulse block frequency may be changed depending on difference d corresponding to a position error. For example, it is possible to reduce the operating speed of the driving unit by reducing the pulse block frequency stepwise (e.g., by setting the pulse block frequency to 20 to 30 kHz in the high-speed driving mode, for example, in case that difference d is large, and changing the pulse block frequency to 10 to 15 kHz in the medium-speed driving mode or the low-speed driving mode when difference d becomes small).

Specifically, when the pulse block frequency is set to 20 kHz for a drive signal with a drive pulse of 700 kHz, the number of pulses included in one pulse block is 700 kHz/20 kHz=35 pulses in the case of the pulse block duty cycle of 100%, 35/2=18 pulses in the case of 50%, and 18/2=9 pulses in the case of 25%.

In contrast, when the pulse block frequency is set to 10 kHz for a drive signal with a drive pulse of 700 kHz, the number of pulses included in one pulse block is 700 kHz/10 kHz=70 pulses when the pulse block duty cycle is 100%, 70/2=35 pulses when the pulse block duty cycle is 50%, 35/2=18 pulses when the pulse block duty cycle is 25%, and 18/8=9 pulses when the pulse block duty cycle is 12.5%.

That is, decreasing the pulse block frequency increases the number of pulses included in one block pulse. Accordingly, the variable range of the pulse duty cycle becomes wider. Therefore, it is possible to reduce the minimum value of the pulse block duty cycle that can be set, and it becomes easier to reduce the operating speed of the driving unit.

As is understood, the driving-unit operation method according to the present invention is a method for operating the driving unit that drives passive element C-4 relative to active element C-1, the active element C-1 including resonator C-2 and at least one excitation section C-23 for exciting a vibration of the resonator C-2. The resonator C-2 includes at least one arm C-21 extending from coupling portion C-20 of the resonator C-2. The at least one arm C-21 includes contact portion C-31 at an outer end of the arm C-21, and contact portion C-31 is movable by vibrational motion of the at least one arm C-21. Passive element C-4 is disposed to be driven by vibrational motion to move relative to active element C-1. In addition, passive element C-4 includes first contact region C-41, and is disposed such that the first contact region C-41 makes contact with the first contact portion C-31. Active element C-1 and passive element C-4 are disposed such that, when active element C-1 is not excited, at least first contact portion C-31 is pushed toward first contact region C-41 by a prestressing force.

In addition, the driving-unit operation method includes: driving excitation section C-23 by a drive signal that is a periodic signal including a drive pulse repeated at an excitation frequency, while repeatedly omitting the drive pulse, thereby generating a periodically repeated pulse block with a pulse block duty cycle expressed by a relation Ton/Tb between a pulse block on time Ton and a pulse block cycle Tb; and modifying the drive signal depending on the position error signal.

In the step of modifying the drive signal, in case that the position error signal is within a first range, a shape of the drive pulse is modified into a first driving pulse shape or the excitation frequency is modified by a first excitation frequency detuning value, and the pulse block duty cycle is set to a first pulse block duty cycle value (C-83 and C-84 in FIG. 24), and in case that the position error signal is within a second range, the shape of the drive pulse is modified into a second drive pulse shape or the excitation frequency is modified by a second excitation frequency detuning value, and the pulse block duty cycle is set to a second pulse block duty cycle value (C-85 and C-86 in FIG. 24).

Having different pulse block duty cycle values by repeatedly omitting the drive pulse corresponds to modifying, depending on the position error signal, duration time Toff that is the turn-off period in which the drive pulse is omitted. This allows passive element C-4 to be driven quasi-continuously at a relatively slow average speed. Thus, speed reduction can be achieved more than can be achieved only by reducing the shape of the drive pulse, and it is possible to achieve a given speed set point. Such a speed lowers the energy of the drive pulse below the threshold required for the driving unit to operate reliably. For a higher speed, it is possible to control the speed by the shape of the drive pulse.

By using different combinations of the shapes (or excitation frequency detuning values) of the drive pulse and pulse block duty cycles, the moving speed of movement of the driving unit to a set point (target position) is adapted to the magnitude of the position error signal. Consequently, the position control on the driving unit is performed at high speed and accurately.

Whenever reference is made throughout this specification to the operating speed and position of the driving unit, the operating speed and position generally refer to the motion speed or position of passive element C-4 relative to active element C-1. The motion may be linear or rotational or a combination thereof, depending on the mechanical structure and excitation configuration.

In the embodiment, the driving unit is a piezoelectric driving unit, and excitation section C-23 are piezoelectric elements. In another embodiment, an electromagnetic actuator (such as a voice coil), a magnetostrictive actuator, or a shape memory alloy based actuator may be used as the driving unit.

Typically, as described in PTL 1 or 2, the motion of contact portion C-31 serves to apply a repetitive pushing force to passive element C-4 to move passive element C-4, and the direction of the motion can be controlled by the excitation frequency of excitation section C-23.

Thus, depending on the excitation frequency, active element C-1 may drive passive element C-4 to move in a first direction or a second direction opposite to the first direction. In the embodiment, the motion by passive element C-4 is a translational motion. In another embodiment, this motion is a rotational motion. In the embodiment, resonator C-2 and its parts are manufactured from a single piece of sheet material, in particular, from a sheet metal piece.

In the embodiment, in case that the position error signal is within a third range, the shape of the drive pulse is modified to a third drive pulse shape, or the excitation frequency is modified by a third excitation frequency detuning value. Further, the pulse block duty cycle is set to a third pulse block duty cycle value (steps C-87 and C-88 in FIG. 24).

In the embodiment, modifying the shape of the drive pulse is performed by at least one of modification of the amplitude of the drive pulse and modification of the pulse width of the drive pulse.

In the embodiment, modifying the shape of the drive pulse includes, in every case, maintaining the excitation frequency the same and maintaining the energy transmitted by each drive pulse such that the energy is greater than a non-zero minimum pulse energy value.

Maintaining the energy transmitted by each drive pulse such that the energy is greater than the non-zero minimum pulse energy value is accomplished by maintaining the pulse duty cycle of the drive pulse above a minimum pulse duty cycle value and maintaining the amplitude of the drive pulse above a minimum amplitude value.

In the embodiment, the minimum pulse energy value is at least 5% or preferably at least 10% of the maximum energy of the pulse.

In the embodiment, the modification of the excitation frequency includes modifying the excitation frequency by an amount for reducing only the matching between the excitation frequency and the natural frequency of the driving unit in a vibration mode without changing the vibration mode. This reduces the energy transmission to the mechanical vibration and consequently reduces the amplitude.

In the embodiment, the drive pulse is repeatedly omitted, and during the turn-off period in which the drive pulse is omitted, the position of passive element C-4 relative to active element C-1 is held by the prestressing force.

In the embodiment, in case that the drive pulse is repeatedly omitted, duration time Ton of the turn-on period during which the drive pulse is applied is sufficient to achieve the amplitude at which active element C-1 drives passive element C-4 by the vibration of active element C-1.

In the embodiment, the excitation frequency is in the range of from 50 kHz to 1,000 kHz, and the repeated omission of the drive pulse is performed at a frequency of from one tenth to one hundredth of the excitation frequency.

In the embodiment, the first range exceeds the second range, the energy of the drive pulse with the first drive pulse shape is greater than the energy of the drive pulse with the second drive pulse shape, and the first pulse block duty cycle value is greater than the second pulse block duty cycle value.

Therefore, in case that the value of the position error signal is higher, i.e., in case that the position error signal is within the first range, the operating speed of the driving unit is faster than in case that the position error signal is within the second range. This is because the energy of the drive pulse is greater and/or the pulse block duty cycle is greater in case that the position error signal is within the first range than in case that the position error signal is within the second range.

In the embodiment, the drive pulse with the first drive pulse shape is a rectangular pulse, the pulse duty cycle is 50%, and the first pulse block duty cycle value is 100%. This corresponds to a rectangular pulse sequence with maximum power for a given peak voltage of a signal.

In the embodiment, the second range exceeds the third range, the energy of the drive pulse with the second drive pulse shape is greater than the energy of the drive pulse with the third drive pulse shape, and the second pulse block duty cycle value is greater than the third pulse block duty cycle value.

Therefore, in case that the value of the position error signal is smaller, i.e., in case that the position error signal is within the third range, the operating speed of the driving unit is slower than in case that the position error signal is within the second range. This is because the energy of the drive pulse is smaller and/or the pulse block duty cycle is smaller in case that the position error signal is within the third range than in case that the position error signal is within the second range.

In the embodiment, the driving-unit operation method includes setting the frequency of the excitation frequency depending on the sign of the position error signal. Thus, the direction of motion can be changed by selecting the excitation frequency, and the direction of motion can be set depending on the direction in which the driving unit has to be moved in order to reduce the position error.

In the embodiment, the driving-unit operation method is for operating the driving unit such that drive passive element C-4 is driven relative to active element C-1, active element C-1 including resonator C-2 and at least one excitation section C-23 for exciting the vibration of resonator C-2, resonator C-2 including at least two arms C-21 and C-22 extending from coupling portion C-20 of resonator C-2, arms C-21 and C-22 respectively including contact portions C-31 and C-32 at the outer ends of arms C-21 and C-22, contact portions C-31 and C-32 being movable by the vibrational motions of respective arms C-21 and C-22. Passive element C-4 is disposed to be driven by these vibrational motions to be moved relative to active element C-1. Further, passive element C-4 includes first and second contact regions C-41 and C-42, and contact regions C-41 and C-42 are disposed to make contact respectively with first and second contact portions C-31 and C-32. Active element C-1 and passive element C-4 are disposed so as to push first and second contact portions C-31 and C-32 respectively toward first and second contact regions C-41 and C-42 by a prestressing force when active element C-1 and passive element C-4 are not excited (in particular when active element C-1 is not excited).

In the embodiment, second arm C-22 is disposed to move in a vibrational motion that is balanced with the vibrational motion of first arm C-21. That is, when excitation section C-23 are excited at a frequency that drives passive element C-4 relative to active element C-1, first arm C-21 and second arm C-22 vibrate by motions that are balanced with each other.

Resonator C-2 of the type presented herein typically includes a resonator axis corresponding to the axis of symmetry of the geometric shape of resonator C-2. In the case of resonator C-2 having a substantially planar shape, the resonator axis is located in its reference plane. The symmetry with respect to the resonator axis is understood to correspond to the schematic shape of arms C-21 and C-22, and it is probable that the resonator is not perfectly symmetric in respect of details of the shape of arms C-21 and C-22.

Thus, when extending substantially symmetrically from coupling portion C-20, at least two arms C-21 and C-22 may differ from each other in their shapes or contours in detail. For example, one arm (e.g., first arm C-21) may be shorter than the other arm (e.g., second arm C-22) when measured in the direction in which arms C-21 and C-22 extend. For example, one arm may be up to 10%, up to 20%, up to 30%, or up to 40% shorter than the other arm.

Arms C-21 and C-22 disposed symmetrically with respect to the resonator axis or a symmetry point allow the motions of arms C-21 and C-22 to be balanced with each other when vibrating. Accordingly, the vibrational motion of resonator C-2 can be made substantially symmetrical with respect to the resonator axis.

In the embodiment, coupling portion C-20 has a substantially rectangular shape. Typically, excitation section C-23 are also substantially rectangular. The sides of the rectangle corresponding to rectangular approximation of coupling portion C-20 can be positioned parallel to the sides of the rectangle corresponding to rectangular approximation of excitation section C-23.

Integrally shaped resonator C-2 and its parts mean, in other words, that the parts of resonator C-2 such as coupling portion C-20, first and second arms C-21 and C-22, the attachment region, and optionally a bearing arm are manufactured as a single part integral with resonator C-2. This can be done, for example, by punching or cutting of resonator C-2 from a sheet metal piece, by casting, or by an additional manufacturing process.

Further, in the present embodiment, controller C-90 is a controller configured to perform the driving-unit operation method described above, in which the controller is configured to be connected to and supply electric power to excitation section C-23 of the driving unit, and to judge the position of the driving unit by reading a signal from sensor 91.

Further embodiments of controller C-90 are apparent from the dependent claims according to the method claim. Also, the features of the method claim may be combined with the features of the apparatus claim and vice versa.

While the invention made by the present inventors has been specifically described based on the preferred embodiment, it is not intended to limit the present invention to the above-mentioned preferred embodiment, but the present invention may be further modified within the scope and spirit of the invention defined by the appended claims.

For example, while smartphone M serving as a camera-equipped mobile terminal has been described in the embodiment as an example of the camera-mounted device including camera module A, the present invention is applicable to a camera-mounted device including a camera module and an image processing part that processes image information obtained by the camera module. The camera-mounted device encompasses an information apparatus and a transporting apparatus. Examples of the information apparatus include a camera-mounted mobile phone, a note-type personal computer, a tablet terminal, a mobile game machine, a web camera, and a camera-mounted in-vehicle device (for example, a rear-view monitor device or a drive recorder device). In addition, examples of the transporting apparatus include an automobile.

Figure 25A:
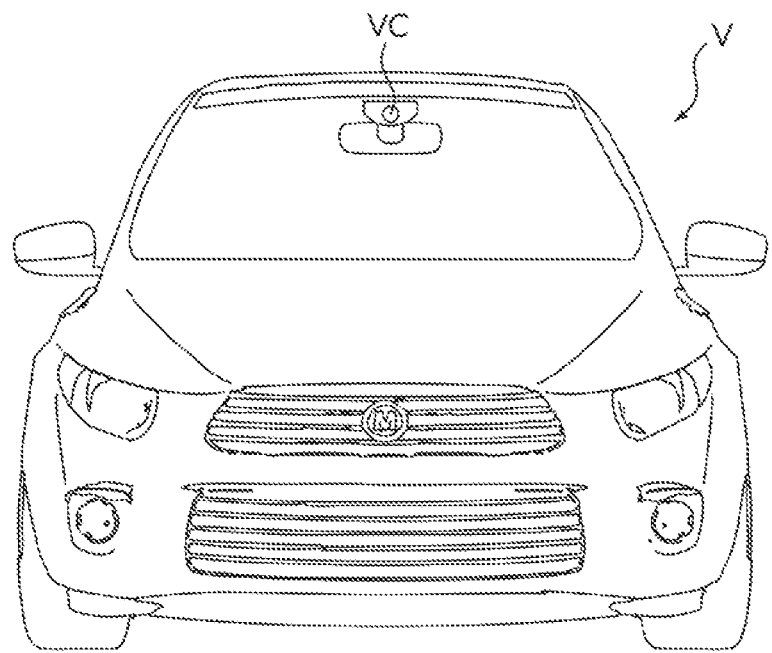
FIGS. 25A and 25B illustrate an automobile as a camera-mounted device in which an in-vehicle camera module is mounted.
Figure 25B:
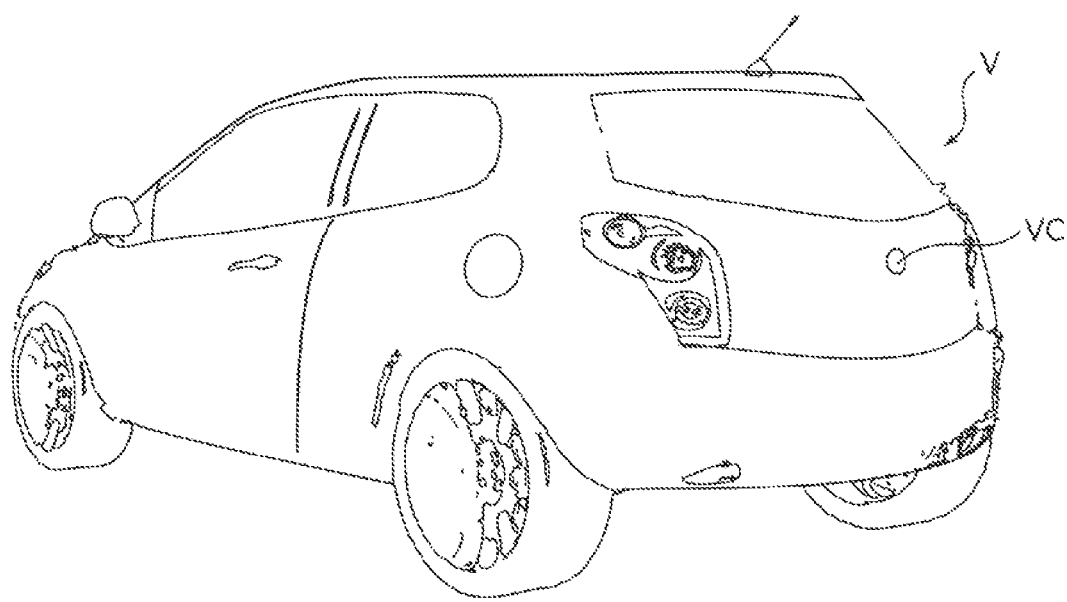

FIGS. 25A and 25B illustrate automobile V serving as the camera-mounted device in which in-vehicle camera module VC (Vehicle Camera) is mounted. FIG. 25A is a front view of automobile V and FIG. 25B is a rear perspective view of automobile V. In automobile V, camera module A described in the embodiment is mounted as in-vehicle camera module VC. As illustrated in FIGS. 25A and 25B, in-vehicle camera module VC may, for example, be attached to the windshield so as to face forward, or to the rear gate so as to face backward. In-vehicle camera module VC is used for rear monitoring, drive recording, collision avoidance control, automatic drive control, and the like.

Further, in the embodiment, first arm portion 141*b* of AF driving part 14 is brought into contact with AF biasing member 112 or 512 constituting AF movable part 11 or 51, but may make direct contact with lens holder 111 or 511. Note however that, contact with AF biasing member 112 or 512 that is a metal molded article rather than contact with lens holder 111 or 511 that is a resin molded article allows more efficient transmission of the drive force and also improves the durability.

Further, a biasing member for biasing lens holder 111 or 511 toward first stage 12 and a member with which first arm portion 141*b* of AF driving part 14 makes contact may be disposed separately.

Further, in the embodiment, two AF driving parts 14A and 14B are provided, but the number of AF driving parts 14 may be one, three, or more as long as the AF driving parts can exert a driving force capable of moving AF movable part 11 or 51 in the Z direction.

In addition, the present invention can be applied not only to autofocus but also to a case where a movable part is moved in the optical-axis direction, such as zoom.

Further, the support structure of AF movable part 51 using AF biasing member 512 in Embodiment 2 is not limited to the case where the driving source is composed of an ultrasonic motor as in AF driving parts 14, but can also be applied to a lens driving device including a driving source (e.g., voice coil motor (VCM)) other than an ultrasonic motor.

The embodiment disclosed herein is merely an exemplification in every respect and should not be considered as limitative. The scope of the present invention is specified by the claims, not by the above-mentioned description. The scope of the present invention is intended to include all modifications in so far as they are within the scope of the appended claims or the equivalents thereof.

The disclosure of Japanese Patent Application No. 2019-225710 dated Dec. 13, 2019 including the specification, drawings and abstract is incorporated herein by reference in its entirety.

REFERENCE SIGNS LIST

1, 1A Lens driving device
10, 10A OIS movable part (second movable part)
11, 51 AF movable part (first movable part)
111, 511 Lens holder
112, 512 AF biasing member
12 First stage (first fixing part)
13 Second stage
14 AF driving part (Z-direction driving part)
141 AF resonant portion
142 AF piezoelectric element
143 AF electrode
15 AF supporting part (first supporting part)
20 OIS fixing part (second fixing part)
21 Base
30 OIS driving part (XY direction driving part)
31 OIS resonant portion
32 OIS piezoelectric element
33 OIS electrode
34 OIS power transmission part
40 OIS supporting part (second supporting part)
50 OIS biasing member
A Camera module
M Smartphone (camera-mounted device)

What is claimed is:

1. A driving-unit operation method of operating a driving unit for driving a passive element relative to an active element,
   the active element including a resonator and at least one excitation section configured to excite a vibration of the resonator,
   the resonator including at least one arm extending from a coupling portion of the resonator,
   the at least one arm including a contact portion at an outer end of the at least one arm,
   the contact portion being movable by vibrational motion of the at least one arm,
   the passive element being disposed to be driven by the vibrational motion to move relative to the active element,
   the passive element including a first contact region and being disposed such that the first contact region and the first contact portion make contact with each other by a prestressing force when the active element is not excited,
   the driving-unit operation method comprising:
   driving the at least one excitation section by a drive signal that is a periodic signal including a drive pulse repeated at an excitation frequency, while repeatedly omitting the drive pulse, thereby generating a periodically repeated pulse block with a pulse block duty cycle expressed by a relation Ton/Tb between a pulse block on time (Ton) and a pulse block cycle (Tb); and modifying the drive signal depending on the position error signal, wherein in the modifying the drive signal:

in case that a position error signal is within a first range, a shape of the drive pulse is modified into a first driving pulse shape or the excitation frequency is modified by a first excitation frequency detuning value, and the pulse block duty cycle is set to a first pulse block duty cycle value, and in case that the position error signal is within a second range, the shape of the drive pulse is modified into a second drive pulse shape or the excitation frequency is modified by a second excitation frequency detuning value, and the pulse block duty cycle is set to a second pulse block duty cycle value.

2. The driving-unit operation method according to claim 1, wherein in the modifying the drive signal, in case that the position error signal is within a third range, the shape of the drive pulse is modified into a third drive pulse shape or the excitation frequency is modified by a third excitation frequency detuning value, and the pulse block duty cycle is set to a third pulse block duty cycle value.

3. The driving-unit operation method according to claim 1, wherein the modifying the shape of the drive pulse is performed by at least one of modification of an amplitude of the drive pulse and modification of a pulse width of the drive pulse.

4. The driving-unit operation method according to claim 1, wherein the modifying the shape of the drive pulse includes, in every case, maintaining the excitation frequency the same and maintaining energy transmitted by each drive pulse such that the energy is greater than a non-zero minimum pulse energy value.

5. The driving-unit operation method according to claim 4, wherein the non-zero minimum pulse energy value is at least 5% or in particular at least 10% of maximum energy of the drive pulse.

6. The driving-unit operation method according to claim 1, wherein a position of the passive element relative to the active element is maintained by the prestressing force during a turn-off period in which the drive pulse is omitted.

7. The driving-unit operation method according to claim 1, wherein the excitation frequency is in a range of from 50 kHz to 1,000 kHz, and the repeated omission of the drive pulse is performed at a frequency of from one tenth to one hundredth of the excitation frequency.

8. The driving-unit operation method according to claim 1, wherein:

the first range is greater than the second range, the energy of the drive pulse having the first drive pulse shape is greater than the energy of the drive pulse having the second drive pulse shape, and the first pulse block duty cycle value is greater than the second pulse block duty cycle value.

9. The driving-unit operation method according to claim 8, wherein the drive pulse having the first drive pulse shape is a rectangular pulse of a pulse duty cycle of 50% and the first pulse block duty cycle value is 100%.

10. The driving-unit operation method according to claim 8, wherein:

the second range is greater than the third range, the energy of the drive pulse having the second drive pulse shape is greater than the energy of the drive pulse having the third drive pulse shape, and the second pulse block duty cycle value is greater than the third pulse block duty cycle value.

11. The driving-unit operation method according to claim 1, further comprising:

setting a frequency of the excitation frequency depending on a sign of the position error signal.

12. The driving-unit operation method according to claim 1, wherein:

the resonator includes at least two arms extending from a coupling portion of the resonator, each of the at least two arms includes the contact portion at an end of each arm, and the passive element includes a first contact region and a second contact region, and is disposed such that the first contact region and the first contact portion make contact with each other and the second contact region and the second contact portion make contact with each other respectively by a prestressing force when the active element is not excited.

13. A controller configured to perform a method according to claim 1, wherein the controller is configured to be connected to and supply electric power to the at least one excitation section of the driving unit, and to judge a position of the driving unit by reading a signal from a sensor.

* * * * *